(12) United States Patent
Liu

(10) Patent No.: US 10,274,758 B1
(45) Date of Patent: Apr. 30, 2019

(54) OPTICAL LINKED SENSOR NETWORK

(71) Applicant: Facebook Technologies, LLC, Menlo Park, CA (US)

(72) Inventor: Xinqiao Liu, Medina, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 15/937,775

(22) Filed: Mar. 27, 2018

(51) Int. Cl.
*G02F 1/025* (2006.01)
*G02B 27/01* (2006.01)

(52) U.S. Cl.
CPC ......... *G02F 1/025* (2013.01); *G02B 27/0172* (2013.01); *G02B 27/0179* (2013.01); *G02B 2027/0138* (2013.01); *G02B 2027/0178* (2013.01); *G02B 2027/0187* (2013.01); *G02F 2201/302* (2013.01); *G02F 2202/105* (2013.01)

(58) Field of Classification Search
CPC .. G02F 1/025; G02B 27/0172; G02B 27/0179
See application file for complete search history.

(56) References Cited

U.S. PATENT DOCUMENTS

| | | | | |
|---|---|---|---|---|
| 6,778,557 | B1* | 8/2004 | Yuki | H04L 12/1877 370/230 |
| 2014/0247355 | A1* | 9/2014 | Ihlenburg | H04N 7/18 348/148 |
| 2015/0381277 | A1* | 12/2015 | Shimizu | H04B 10/572 398/34 |
| 2016/0299228 | A1* | 10/2016 | Maleki | G01S 17/325 |
| 2018/0227549 | A1* | 8/2018 | Cai | H04N 7/22 |

* cited by examiner

*Primary Examiner* — Ryan A Lepisto
(74) *Attorney, Agent, or Firm* — Kilpatrick Townsend & Stockton LLP

(57) ABSTRACT

Examples of an apparatus are disclosed. In some examples, an apparatus may comprise a first waveguide configured to propagate light originated from a light source, a first modulator coupled with the first waveguide, and a first sensor coupled with the first modulator. The apparatus may further comprise a second waveguide coupled with the first waveguide to form a propagation path for the light between the light source and a receiver device, a second modulator coupled with the second waveguide, and a second sensor coupled with the second modulator. The first modulator is configured to modulate the light propagating in the first waveguide based on sensor data from the first sensor, and the second modulator is configured to modulate the light propagating in the second waveguide based on sensor data from the second sensor, to enable the receiver device to obtain the sensor data.

25 Claims, 17 Drawing Sheets

US 10,274,758 B1

OPTICAL LINKED SENSOR NETWORK

BACKGROUND

The disclosure relates generally to sensor network, and more specifically to optical linked sensor network in a wearable electronic device such as a head mounted display (HMD).

A wearable electronic device may include numerous sensors to support different applications of the device. For example, wearable virtual-reality (VR) systems, augmented-reality (AR) systems, and mixed reality (MR) systems may include numerous image sensors. The image sensors can be used to generate physical image data of a physical environment in which a user is located. The physical image data can be provided to a processor operating a simultaneous localization and mapping (SLAM) algorithm to track, for example, a location of the user, an orientation of the HMD, and/or a path of movement of the user in the physical environment. The image sensors can also be used to generate physical image data including stereo depth information for measuring a distance between the user and an object in the physical environment. The image sensors can also be configured as a near-infrared (NIR) sensor. An illuminator may project a pattern of NIR light into the eyeballs of the user. The internal structures of the eyeballs (e.g., the pupils) may generate a reflective pattern from the NIR light. The image sensors can capture images of the reflective pattern, and provide the images to the processor to track the movement of the eyeballs of the user to determine a gaze point of the user. Based on these physical image data, the processor may determine a location and/or a movement of the user, a relative location of the user with respect to an object, a gazing direction of the user, etc. Based on this information, the VR/AR/MR system can generate and update, for example, virtual image data for displaying to the user via the near-eye display, audio data for outputting to the user via a speaker, etc., to provide an interactive experience to the user.

The industry has adopted various serial interface standards, such as the specifications provided by Mobile Industry Processor Interface (MIPI), for data transmission between devices. For example, MIPI specification defines a set of standardized interfaces (e.g., Camera Serial Interface (CSI)) for connecting between devices (e.g., between an imaging device and a processing device). The specification defines a set of physical layers including, for example, M-PHY, D-PHY, and C-PHY, for providing physical connection between the imaging device and a processing device (e.g., an application processor) for transmission of data, as well as a set of protocol layers for processing of the data (e.g., pixel-byte conversion, error detection and correction, etc.). The standardized physical layers (e.g., M-PHY, D-PHY, and C-PHY) are typically implemented as point-to-point interconnects. To provide connections between multiple imaging devices to a processing device, each imaging device may have a dedicated interconnect with the processing device. Each dedicated interconnect may include one or more data lanes for transmitting sensor data. The data lanes are typically metal wires or traces to transmit electrical signals representing the sensor data.

Although MIPI interfaces provide good performance, implementing the point-to-point MIPI physical layers for a sensor network comprising multiple sensors may be challenging, especially for a sensor network in a wearable device. To provide a dedicated interconnect between each of the sensors and a processor, a large number of electrical wires as well as input-output (I/O) interface circuitries may be needed. The electrical wires can take up substantial space at least because each of these electrical wires needs to be shielded, or otherwise be spaced apart by a certain distance, to mitigate crosstalk between the wires as they are carrying high speed signals typically at 1 GHz or above. Moreover, large signal power may be needed to overcome the resistance and capacitance of the electrical wires, which increases the power consumption by the I/O interface circuitries. The space and power taken up by the interconnects further increase when multiple data lanes are included for each dedicated interconnect. Given that a wearable device typically has a small form factor and provides very limited space for electrical wires and I/O interface circuitries, and that the wearable device needs to operate with low power, it becomes very challenging to MIPI physical layers for a sensor network in a wearable device.

Accordingly, there is a need for a sensor network which supports high speed transmission of sensor data from multiple sensors, and which occupies a small area and consumes low power.

SUMMARY

The present disclosure relates to sensor network. More specifically, and without limitation, this disclosure relates to an optical sensor network that can be used in a wearable electronic device such as a head mounted display (HMD).

In some examples, an apparatus is provided. The apparatus may comprise a first waveguide configured to propagate light originated from a light source, a first modulator coupled with the first waveguide, and a first sensor coupled with the first modulator. The apparatus may further comprise a second waveguide coupled with the first waveguide to form a propagation path for the light between the light source and a receiver device, a second modulator coupled with the second waveguide, and a second sensor coupled with the second modulator. The first sensor is configured to generate first sensor data, and the first modulator is configured to modulate the light propagating in the first waveguide based on the first sensor data. The second sensor is configured to generate second sensor data, and the second modulator is configured to modulate the light propagating in the second waveguide based on the second sensor data. The second waveguide is configured to propagate the light modulated by at least one of the first modulator or the second modulator towards the receiver device, to enable the receiver device to obtain at least one of the first sensor data or the second sensor data.

In some aspects, the apparatus is a first apparatus that is part of a wearable device. The light source and the receiver device are in a second apparatus that is also part of the wearable device. At least one of the first sensor or the second sensor comprises an image sensor.

In some aspects, the first modulator and the second modulator are scheduled to modulate the light transmitted in the first waveguide at different times based on a time-division multiple access (TDMA) scheme. The light being modulated may be associated with a single wavelength.

In some aspects, the apparatus may further comprise a first buffer coupled with the first sensor and a second buffer coupled with the second sensor. The first buffer is configured to store the first sensor data generated by the first sensor during a time when the first modulator is not scheduled to modulate the light propagating in the first waveguide. The second buffer is configured to store the second sensor data generated by the second sensor during a time when the second modulator is not scheduled to modulate the light propagating in the second waveguide.

In some aspects, the light being modulated may include a first component associated with a first wavelength and a second component associated with a second wavelength. The first modulator and the second modulator are configured to modulate, respectively, the first component based on the first sensor data and the second component based on the second sensor data according to a wavelength division multiple access (WDMA) scheme.

In some aspects, the first modulator and the second modulator are configured to modulate, respectively, the first component and the second component at substantially identical time.

In some aspects, the first modulator is configured to modulate an intensity of the light propagating in the first waveguide, and the second modulator is configured to modulate an intensity of light propagating in the second waveguide.

In some aspects, the first modulator comprises a first ring resonator, the first ring resonator being associated with a configurable first resonant frequency. The first ring resonator can change the intensity of the light propagating in the first waveguide based on a relationship between the configurable first resonant frequency and a frequency of a component of the light propagating in the first waveguide. The second modulator comprises a second ring resonator, the second ring resonator being associated with a configurable second resonant frequency. The second ring resonator can change the intensity of the light propagating in the second waveguide based on a relationship between the configurable second resonant frequency and a frequency of a component of the light propagating in the second waveguide. The first modulator is configured to modulate the first resonant frequency of the first ring resonator to modulate the intensity of the light propagating in the first waveguide. The second modulator is configured to modulate the second resonant frequency of the second ring resonator to modulate the intensity of the light propagating in the second waveguide.

In some aspects, the first modulator includes a first diode controllable to change the first resonant frequency of the first ring resonator by at least changing a free carrier concentration within the first ring resonator. The second modulator includes a second diode controllable to change the second resonant frequency of the second ring resonator by at least changing a free carrier concentration within the second ring resonator.

In some aspects, the first waveguide comprises a first silicon waveguide, and the second waveguide comprises a second silicon waveguide.

In some aspects, the first silicon waveguide is part of a first chip. The second silicon waveguide is part of a second chip. The first silicon waveguide of the first chip is coupled with the second silicon waveguide of the second chip via an optical fiber.

In some aspects, the apparatus further comprises a first grating coupler and a second grating coupler. The first grating coupler is coupled with the first silicon waveguide and with a first end of the optical fiber to direct the light from the first silicon waveguide into the optical fiber. The second grating coupler is coupled with a second end of the optical fiber and with the second silicon waveguide to direct the light from the optical fiber into the second silicon waveguide.

In some aspects, the first silicon waveguide and the first modulator forms a first silicon photonic die. The first sensor is part of a first sensor die. The first chip comprises the first sensor die and the first silicon photonic die forming a first vertical stack structure. The second silicon waveguide and the second modulator forms a second silicon photonic die. The second sensor is part of a second sensor die. The second chip comprises the second sensor die and the second silicon photonic die forming a second vertical stack structure.

In some aspects, the first sensor data and the second sensor data are defined according to an application layer protocol specification of Mobile Industry Processor Interface (MIPI).

In some aspects, the apparatus further comprises a set of electrical signal paths coupled with each of the first sensor and the second sensor. The set of electrical signal paths are configured to transmit control signals and clock signals from a controller to each of the first sensor and to the second sensor.

In some aspects, the first waveguide and the second waveguide forms a shared physical medium over which one or more communication channels are formed, the physical medium being shared between the first sensor and the second sensor for transmission of sensor data to the receiver device using the one or more communication channels.

In some examples, a semiconductor chip is provided. The semiconductor chip includes a first semiconductor layer and a second semiconductor layer. The first semiconductor layer includes one or more sensor devices and one or more transistor devices configured to generate electrical signals representing sensor data generated by the one or more sensor devices. The second semiconductor layer includes a waveguide and one or more optical modulators configured to modulate light propagating in the waveguide based on the electrical signals. The first semiconductor layer forms a stack structure with the second semiconductor layer along an axis. The waveguide can be part of an optical link configured to propagate the light modulated based on the sensor data from a light source to a receiver system.

In some aspects, the one or more sensor devices comprise a photodiode. The one or more transistor devices are configured to generate the electrical signals to represent an intensity of light received at the photodiode.

In some aspects, the one or more sensor devices comprise a microelectromechanical system configured to generate the sensor data related to a movement of one or more components of the microelectromechanical system.

In some aspects, the one or more transistor devices include transistor devices that implement an analog-to-digital converter (ADC) configured to generate a set of digital codes representing of the sensor data. The digital codes are transmitted via the electrical signals.

In some aspects, the one or more transistor devices are configured to output analog signals of the sensor data. The analog signals are transmitted via the electrical signals. The second semiconductor further comprises an ADC configured to generate a set of digital codes representing the analog signals and provide the set of digital codes to the one or more optical modulators.

In some aspects, the one or more transistor devices include transistor devices that implement a buffer to store the sensor data generated by the one or more sensor devices within a duration when the one or more optical modulators are not modulating the light propagating in the waveguide.

In some aspects, the one or more optical modulators comprises a ring modulator associated with a resonant frequency. The ring modulator is configured to modulate an intensity of a component of the light based on a relationship between a frequency of the component and the resonant frequency.

In some aspects, the ring modulator is configured to modulate the intensity of the component of the light sequentially based on a set of digital codes representing the sensor data.

In some aspects, the ring modulator is optically coupled with the waveguide at a coupling region within the second semiconductor layer. The ring modulator is configured to receive the light from the waveguide via optical coupling when the light enters the coupling region, and to cause a phase shift in the light that re-enters the coupling region after propagating around the ring modulator to modulate the intensity of the light that exits from the coupling region and enters the waveguide.

In some aspects, a magnitude of the phase shift of the light is related to at least one of: a refractive index of the ring modulator, a circumference of the ring resonator, or a temperature at the ring modulator when the light propagates around the ring modulator.

In some aspects, the ring modulator includes a P-N diode configured to modulate the refractive index of the ring modulator based on the electrical signals.

In some aspects, the one or more optical modulators comprises a single modulator configured to modulate a single component of the light, a single component having a single frequency.

In some aspects, the one or more optical modulators comprises multiple modulators configured to modulate multiple components of the light, the multiple components having multiple frequencies.

In some aspects, the second semiconductor layer further includes a first grating coupler and a second grating coupler each coupled with an end of the waveguide. The first grating coupler is configured to direct the light into the waveguide. The second grating coupler is configured to direct the light out of the waveguide.

In some aspects, the semiconductor chip further includes one or more interconnects between the first semiconductor layer and the second semiconductor layer. The one or more interconnects comprise at least one of: a through-silicon-via (TSV), a micro bump interconnection, a wire-bound, or a controlled collapse chip connection.

In some examples, a method is provided. The method comprises transmitting light through a propagation path comprising a first waveguide and a second waveguide, the light being originated at a light source; modulating the light transmitted in the first waveguide based on first sensor data generated by a first sensor; modulating the light transmitted in the second waveguide based on second sensor data generated by a second sensor; and transmitting, via the second waveguide, the light modulated based on at least one of the first sensor data or the second sensor data towards a receiver device.

In some aspects, modulating the light transmitted in the first waveguide comprises modulating a first frequency component of the light transmitted in the first waveguide. Modulating the light transmitted in the second waveguide comprises modulating the first frequency component of the light transmitted in the second waveguide.

In some aspects, modulating the light in the first waveguide comprises modulating a first frequency component of the light transmitted in the first waveguide. Modulating the light transmitted in the second waveguide comprises modulating a second frequency component of the light transmitted in the second waveguide.

BRIEF DESCRIPTION OF THE DRAWINGS

Illustrative embodiments are described with reference to the following figures.

Figure 1A:
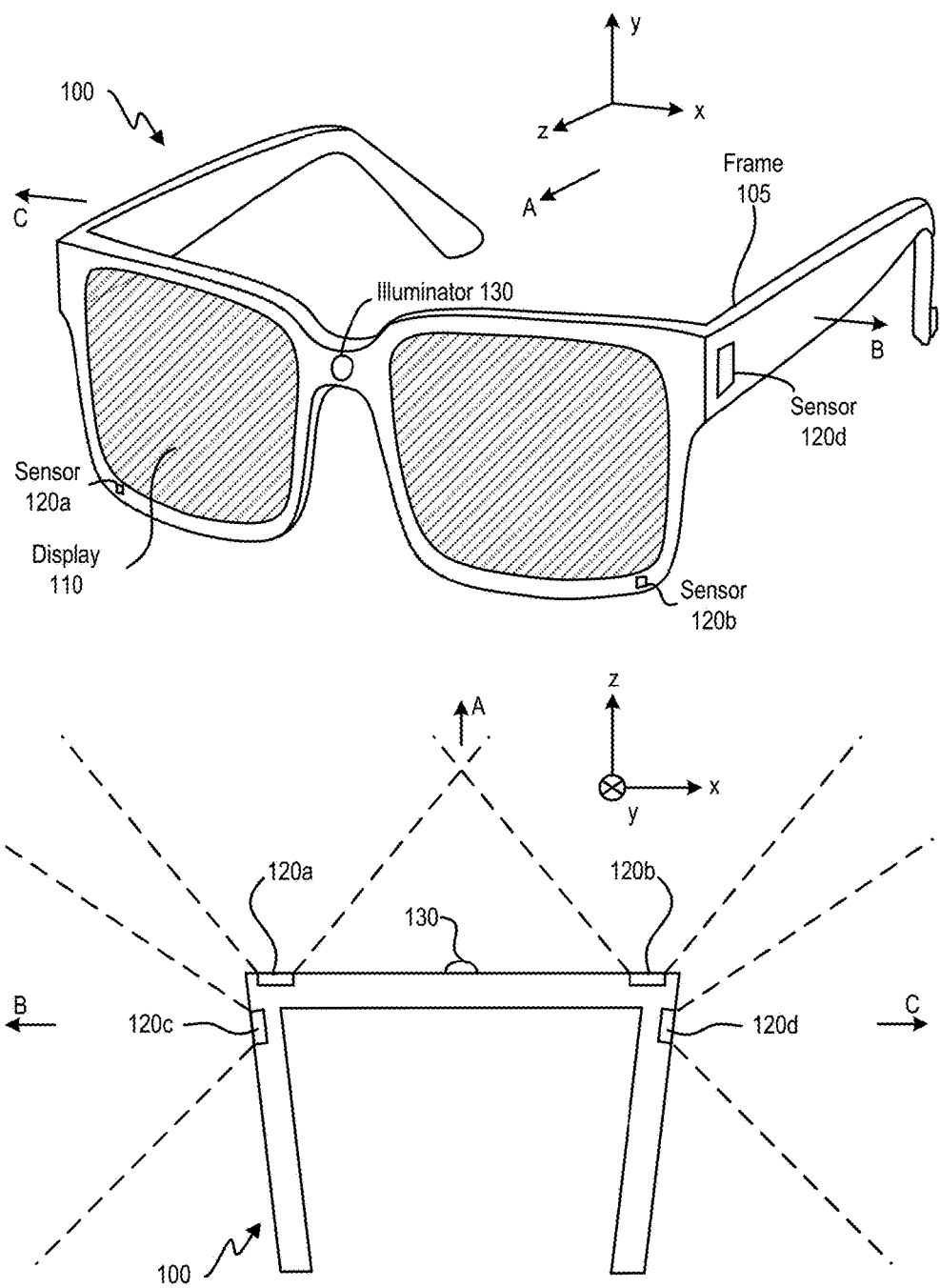
FIGS. 1A and 1B are diagrams of an example of a near-eye display.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth in order to provide a thorough understanding of certain inventive embodiments. However, it will be apparent that various embodiments may be practiced without these specific details. The figures and description are not intended to be restrictive.

This disclosure relates to an optical linked sensor network. The sensor network may include an optical link configured to transmit light from a light source to a receiver device. The optical link includes a first waveguide and a second waveguide. The sensor network may include a first sensor coupled with the first waveguide via a first modulator, and a second sensor coupled with the second waveguide via a second modulator. The first sensor may generate first sensor data, and use the first modulator to modulate the light based on the first sensor data when the light travels in the first waveguide. The second sensor may generate second sensor data, and use the second modulator to modulate the light based on the second sensor data when the light travels in the second waveguide. The light being modulated by at least one of the first modulator or the second modulator can be received at the receiver device, which can obtain at least one of the first sensor data and the second sensor data from the modulated light.

The disclosed techniques provide high speed data transmission from multiple sensors to a receiving device (e.g., a processor) using an optical link that can be shared between the multiple sensors. Compared with point-to-point interconnects, the disclosed techniques can substantially reduce the number of interconnects between the sensors and the receiving device. With fewer interconnects and the associated I/O interface circuitries, the space and power required for the sensor network can be reduced. On the other hand, compared with an electrical wire, an optical link provides a medium that supports a higher data transmission rate and requires much lower power to transmit data at a given data transmission rate. All these can facilitate the integration of multiple sensors in a wearable device, as well as the high speed transmission and processing of large volume of sensor data from the multiple sensors, to improve user experience.

Embodiments of the disclosure may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

FIG. 1A is a diagram of an embodiment of a near-eye display 100. Near-eye display 100 presents media to a user. Examples of media presented by near-eye display 100 include one or more images, video, and/or audio. In some embodiments, audio is presented via an external device (e.g., speakers and/or headphones) that receives audio information from the near-eye display 100, a console, or both, and presents audio data based on the audio information. Near-eye display 100 is generally configured to operate as a virtual reality (VR) display. In some embodiments, near-eye display 100 is modified to operate as an augmented reality (AR) display and/or a mixed reality (MR) display.

Near-eye display 100 includes a frame 105 and a display 110. Frame 105 is coupled to one or more optical elements. Display 110 is configured for the user to see content presented by near-eye display 100. In some embodiments, display 110 comprises a waveguide display assembly for directing light from one or more images to an eye of the user.

Near-eye display 100 further includes image sensors 120*a*, 120*b*, 120*c*, and 120*d*. Each of image sensors 120*a*, 120*b*, 120*c*, and 120*d* may include a pixel array configured to generate image data representing different fields of views along different directions. For example, sensors 120*a* and 120*b* may be configured to provide image data representing two field of views towards a direction A along the Z axis, whereas sensor 120*c* may be configured to provide image data representing a field of view towards a direction B along the X axis, and sensor 120*d* may be configured to provide image data representing a field of view towards a direction C along the X axis.

In some embodiments, sensors 120*a*-120*d* can be configured as input devices to control or influence the display content of the near-eye display 100, to provide an interactive VR/AR/MR experience to a user who wears near-eye display 100. For example, sensors 120*a*-120*d* can generate physical image data of a physical environment in which the user is located. The physical image data can be provided to a location tracking system to track a location and/or a path of movement of the user in the physical environment. A system can then update the image data provided to display 110 based on, for example, the location and orientation of the user, to provide the interactive experience. In some embodiments, the location tracking system may operate a SLAM algorithm to track a set of objects in the physical environment and within a view of field of the user as the user moves within the physical environment. The location tracking system can construct and update a map of the physical environment based on the set of objects, and track the location of the user within the map. By providing image data corresponding to multiple fields of views, sensors 120*a*-120*d* can provide the location tracking system a more holistic view of the physical environment, which can lead to more objects to be included in the construction and updating of the map. With such arrangement, the accuracy and robustness of tracking a location of the user within the physical environment can be improved.

In some embodiments, near-eye display 100 may further include one or more active illuminator 130 to project light into the physical environment. The light projected can be associated with different frequency spectrums (e.g., visible light, infra-red light, ultra-violet light, etc.), and can serve various purposes. For example, illuminator 130 may project light in a dark environment (or in an environment with low intensity of infra-red light, ultra-violet light, etc.) to assist sensors 120*a*-120*d* in capturing images of different objects within the dark environment to, for example, enable location tracking of the user. Illuminator 130 may project certain markers onto the objects within the environment, to assist the location tracking system in identifying the objects for map construction/updating.

In some embodiments, illuminator 130 may also enable stereoscopic imaging. For example, one or more of sensors 120*a* or 120*b* can include both a first pixel array for visible light sensing and a second pixel array for infra-red (IR) light sensing. The first pixel array can be overlaid with a color filter (e.g., a Bayer filter), with each pixel of the first pixel array being configured to measure intensity of light associated with a particular color (e.g., one of red, green or blue colors). The second pixel array (for IR light sensing) can also be overlaid with a filter that allows only IR light through, with each pixel of the second pixel array being configured to measure intensity of IR lights. The pixel arrays can generate an RGB image and an IR image of an object, with each pixel of the IR image being mapped to each pixel of the RGB image. Illuminator 130 may project a set of IR markers on the object, the images of which can be captured by the IR pixel array. Based on a distribution of the IR markers of the object as shown in the image, the system can estimate a distance of different parts of the object from the IR pixel array, and generate a stereoscopic image of the object based on the distances. Based on the stereoscopic image of the object, the system can determine, for example, a relative position of the object with respect to the user, and can update the image data provided to display 100 based on the relative position information to provide the interactive experience.

As discussed above, near-eye display 100 may be operated in environments associated with a very wide range of light intensities. For example, near-eye display 100 may be operated in an indoor environment or in an outdoor environment, and/or at different times of the day. Near-eye display 100 may also operate with or without active illuminator 130 being turned on. As a result, image sensors 120a-120d may need to have a wide dynamic range to be able to operate properly (e.g., to generate an output that correlates with the intensity of incident light) across a very wide range of light intensities associated with different operating environments for near-eye display 100.

Figure 1B:
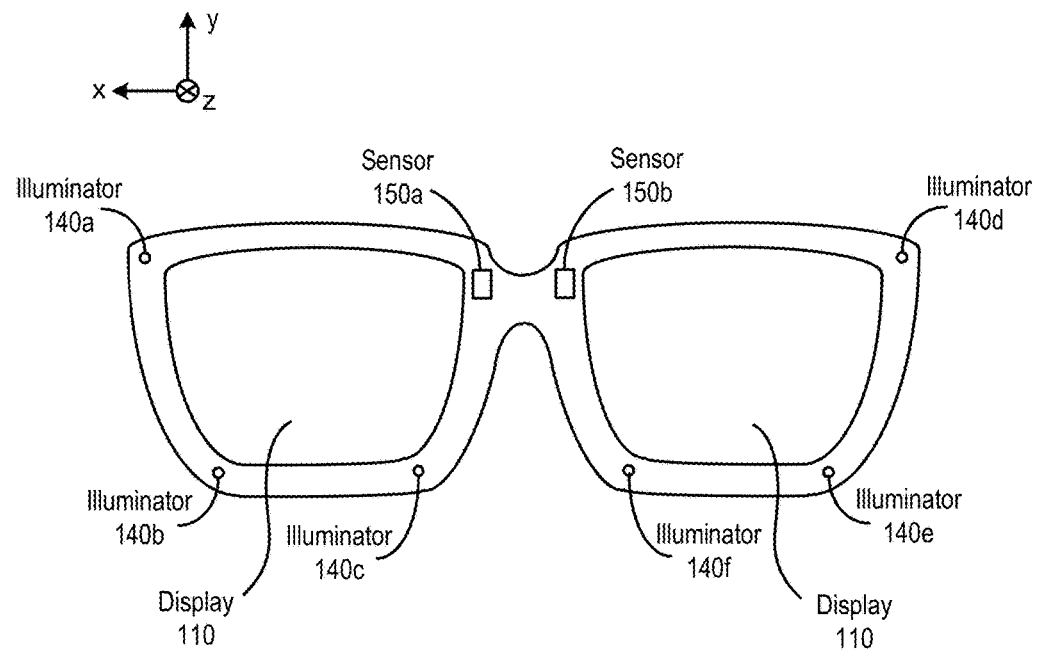

FIG. 1B is a diagram of another embodiment of near-eye display 100. FIG. 1B illustrates a side of near-eye display 100 that faces the eyeball(s) 135 of the user who wears near-eye display 100. As shown in FIG. 1B, near-eye display 100 may further include a plurality of illuminators 140a, 140b, 140c, 140d, 140e, and 140f. Near-eye display 100 further includes a plurality of image sensors 150a and 150b. Illuminators 140a, 140b, and 140c may emit lights of certain frequency range (e.g., NIR) towards direction D (which is opposite to direction A of FIG. 1A). The emitted light may be associated with a certain pattern, and can be reflected by the left eyeball of the user. Sensor 150a may include a pixel array to receive the reflected light and generate an image of the reflected pattern. Similarly, illuminators 140d, 140e, and 140f may emit NIR lights carrying the pattern. The NIR lights can be reflected by the right eyeball of the user, and may be received by sensor 150b. Sensor 150b may also include a pixel array to generate an image of the reflected pattern. Based on the images of the reflected pattern from sensors 150a and 150b, the system can determine a gaze point of the user, and update the image data provided to display 100 based on the determined gaze point to provide an interactive experience to the user.

As discussed above, to avoid damaging the eyeballs of the user, illuminators 140a, 140b, 140c, 140d, 140e, and 140f are typically configured to output lights of very low intensities. In a case where image sensors 150a and 150b comprise the same sensor devices as image sensors 120a-120d of FIG. 1A, the image sensors 120a-120d may need to be able to generate an output that correlates with the intensity of incident light when the intensity of the incident light is very low, which may further increase the dynamic range requirement of the image sensors.

Moreover, the image sensors 120a-120d may need to be able to generate an output at a high speed to track the movements of the eyeballs. For example, a user's eyeball can perform a very rapid movement (e.g., a saccade movement) in which there can be a quick jump from one eyeball position to another. To track the rapid movement of the user's eyeball, image sensors 120a-120d need to generate images of the eyeball at high speed. For example, the rate at which the image sensors generate an image frame (the frame rate) needs to at least match the speed of movement of the eyeball. The high frame rate requires short total exposure time for all of the pixel cells involved in generating the image frame, as well as high speed for converting the sensor outputs into digital values for image generation. Moreover, as discussed above, the image sensors also need to be able to operate at an environment with low light intensity.

Figure 1B:
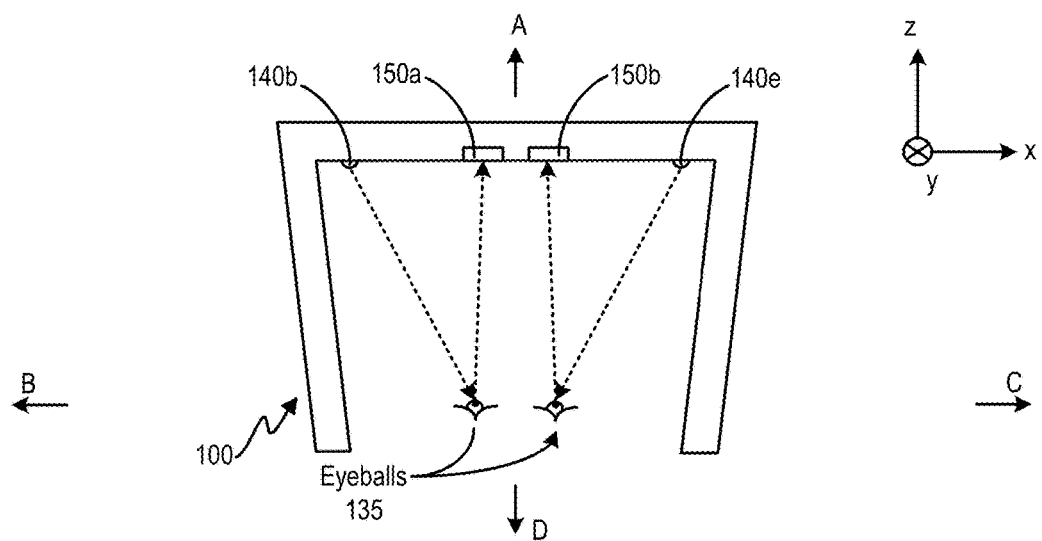
Figure 2:
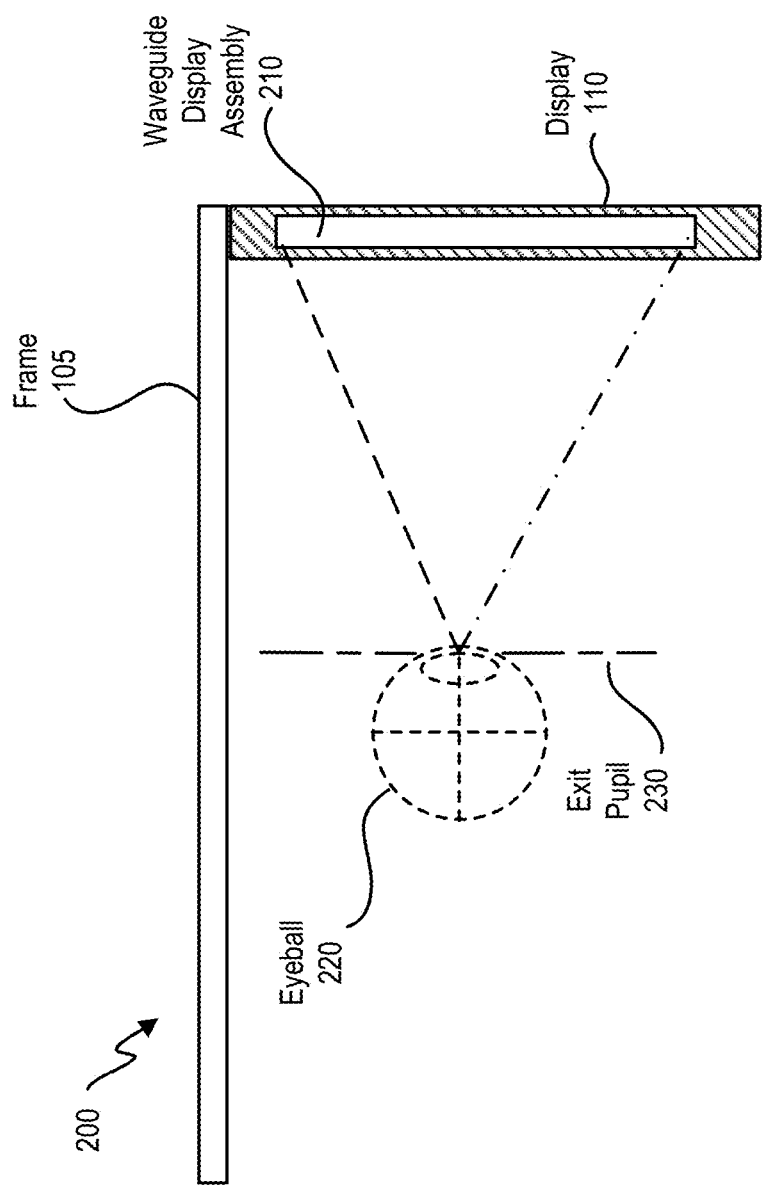
FIG. 2 is an example of a cross section of the near-eye display.

FIG. 2 is an embodiment of a cross section 200 of near-eye display 100 illustrated in FIG. 1. Display 110 includes at least one waveguide display assembly 210. An exit pupil 230 is a location where a single eyeball 220 of the user is positioned in an eyebox region when the user wears the near-eye display 100. For purposes of illustration, FIG. 2 shows the cross section 200 associated eyeball 220 and a single waveguide display assembly 210, but a second waveguide display is used for a second eye of a user.

Waveguide display assembly 210 is configured to direct image light to an eyebox located at exit pupil 230 and to eyeball 220. Waveguide display assembly 210 may be composed of one or more materials (e.g., plastic, glass, etc.) with one or more refractive indices. In some embodiments, near-eye display 100 includes one or more optical elements between waveguide display assembly 210 and eyeball 220.

In some embodiments, waveguide display assembly 210 includes a stack of one or more waveguide displays including, but not restricted to, a stacked waveguide display, a varifocal waveguide display, etc. The stacked waveguide display is a polychromatic display (e.g., a red-green-blue (RGB) display) created by stacking waveguide displays whose respective monochromatic sources are of different colors. The stacked waveguide display is also a polychromatic display that can be projected on multiple planes (e.g., multi-planar colored display). In some configurations, the stacked waveguide display is a monochromatic display that can be projected on multiple planes (e.g., multi-planar monochromatic display). The varifocal waveguide display is a display that can adjust a focal position of image light emitted from the waveguide display. In alternate embodiments, waveguide display assembly 210 may include the stacked waveguide display and the varifocal waveguide display.

Figure 3:
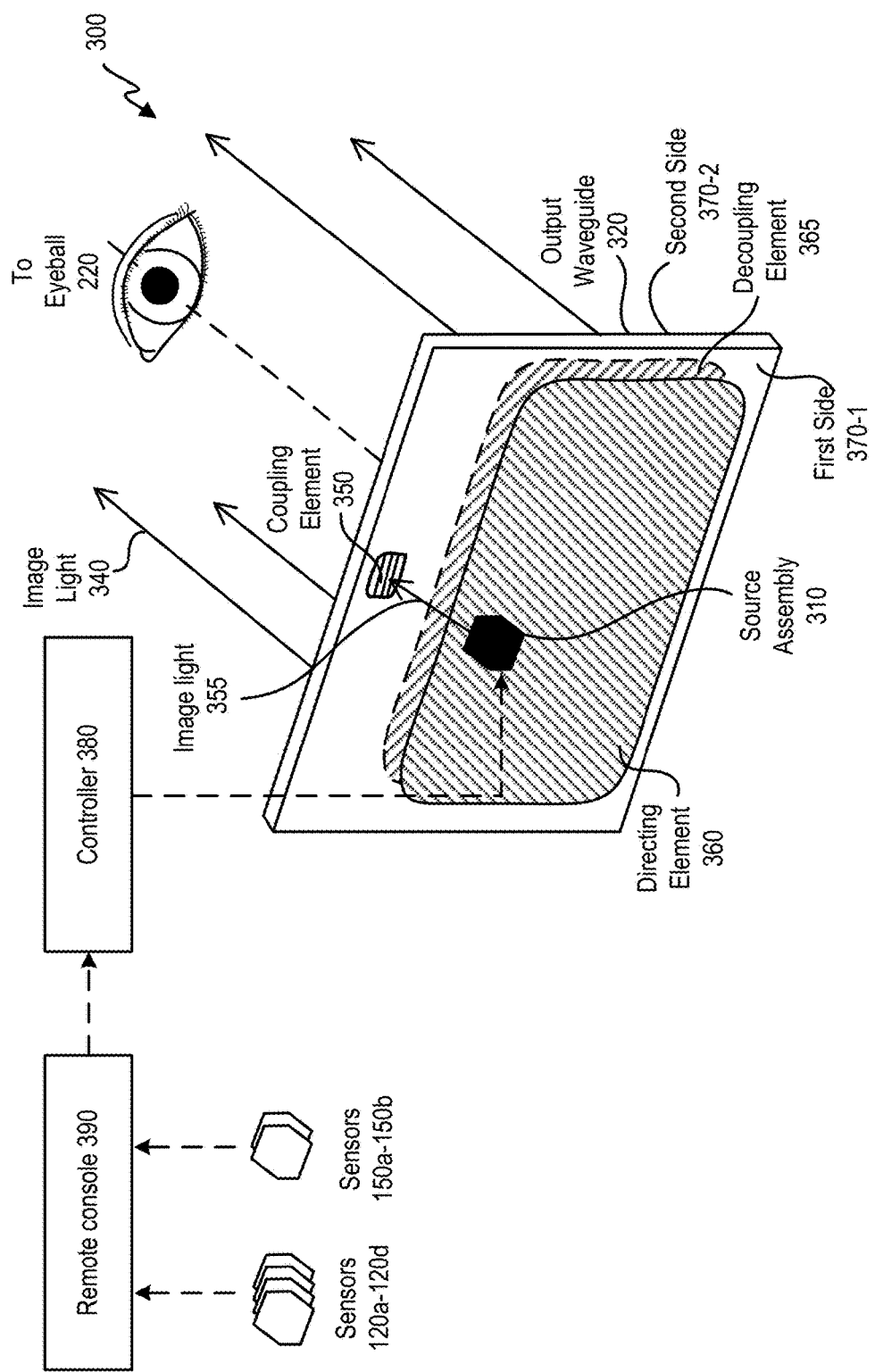
FIG. 3 illustrates an isometric view of an example of a waveguide display with a single source assembly.

FIG. 3 illustrates an isometric view of an embodiment of a waveguide display 300. In some embodiments, waveguide display 300 is a component (e.g., waveguide display assembly 210) of near-eye display 100. In some embodiments, waveguide display 300 is part of some other near-eye display or other system that directs image light to a particular location.

Waveguide display 300 includes a source assembly 310, an output waveguide 320, and a controller 330. For purposes of illustration, FIG. 3 shows the waveguide display 300 associated with a single eyeball 220, but in some embodiments, another waveguide display separate, or partially separate, from the waveguide display 300 provides image light to another eye of the user.

Source assembly 310 generates image light 355. Source assembly 310 generates and outputs image light 355 to a coupling element 350 located on a first side 370-1 of output waveguide 320. Output waveguide 320 is an optical waveguide that outputs expanded image light 340 to an eyeball 220 of a user. Output waveguide 320 receives image light 355 at one or more coupling elements 350 located on the first side 370-1 and guides received input image light 355 to a directing element 360. In some embodiments, coupling element 350 couples the image light 355 from source assembly 310 into output waveguide 320. Coupling element 350 may be, e.g., a diffraction grating, a holographic grating, one or more cascaded reflectors, one or more prismatic surface elements, and/or an array of holographic reflectors.

Directing element 360 redirects the received input image light 355 to decoupling element 365 such that the received input image light 355 is decoupled out of output waveguide 320 via decoupling element 365. Directing element 360 is part of, or affixed to, first side 370-1 of output waveguide 320. Decoupling element 365 is part of, or affixed to, second side 370-2 of output waveguide 320, such that directing element 360 is opposed to the decoupling element 365. Directing element 360 and/or decoupling element 365 may be, e.g., a diffraction grating, a holographic grating, one or more cascaded reflectors, one or more prismatic surface elements, and/or an array of holographic reflectors.

Second side 370-2 represents a plane along an x-dimension and a y-dimension. Output waveguide 320 may be composed of one or more materials that facilitate total internal reflection of image light 355. Output waveguide 320 may be composed of e.g., silicon, plastic, glass, and/or polymers. Output waveguide 320 has a relatively small form factor. For example, output waveguide 320 may be approximately 50 mm wide along x-dimension, 30 mm long along y-dimension and 0.5-1 mm thick along a z-dimension.

Controller 380 controls scanning operations of source assembly 310. For example, controller 380 can determine scanning instructions for the source assembly 310. In some embodiments, the output waveguide 320 outputs expanded image light 340 to the user's eyeball 220 with a large field of view (FOV). For example, the expanded image light 340 is provided to the user's eyeball 220 with a diagonal FOV (in x and y) of 60 degrees and/or greater and/or 150 degrees and/or less. The output waveguide 320 is configured to provide an eyebox with a length of 20 mm or greater and/or equal to or less than 50 mm; and/or a width of 10 mm or greater and/or equal to or less than 50 mm.

Moreover, controller 380 also controls image light 355 generated by source assembly 310 based on image data provided by, for example, sensors 120a-120d of FIG. 1A and sensors 150a and 150b of FIG. 1B. For example, image sensors 120a-120d may be located on first side 370-1 to generate image data of a physical environment in front of the user (e.g., for location determination). Moreover, image sensors 150a and 150b of FIG. 1B may be located on second side 370-2 to generate image data of eyeball 220 (e.g., for gaze point determination) of the user. Image sensors may interface with a remote console 390 that is not located within waveguide display 300. Sensors 120a-120d and 150a-150b may provide image data to remote console 390 which may determine, for example, a location of the user, a gaze point of the user, etc., and determine the content of the images to be displayed to the user. Remote console 390 can transmit instructions to controller 380 related to the determined content. Based on the instructions, controller 380 can control the generation and outputting of image light 355 by source assembly 310.

Figure 4:
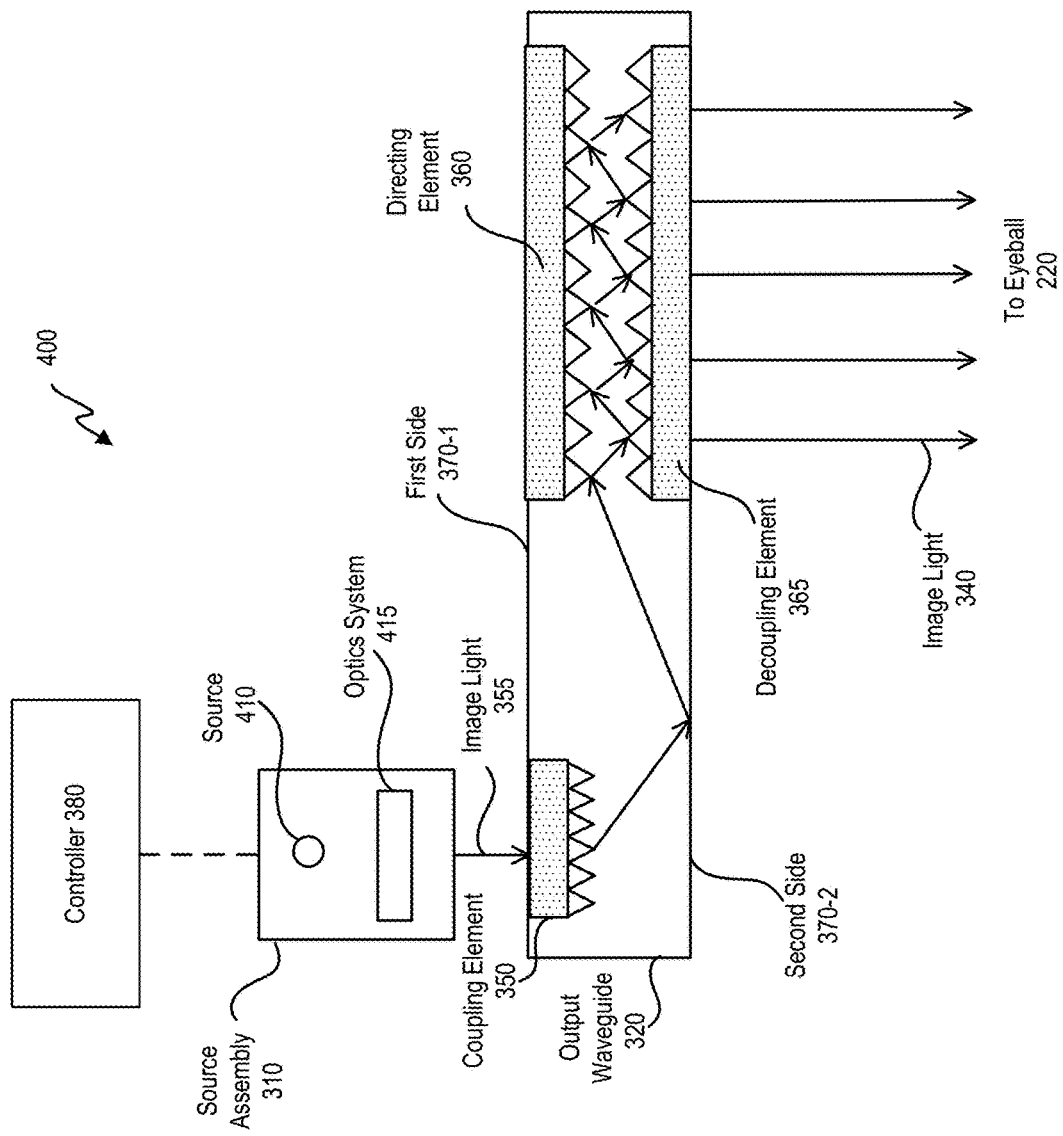
FIG. 4 illustrates a cross section of an example of the waveguide display.

FIG. 4 illustrates an embodiment of a cross section 400 of the waveguide display 300. The cross section 400 includes source assembly 310 and output waveguide 320. Source assembly 310 generates image light 355 in accordance with instructions from the controller 330. Source assembly 310 includes a source 410 and an optics system 415. Source 410 is a light source that generates coherent or partially coherent light. Source 410 may be, e.g., a laser diode, a vertical cavity surface emitting laser, and/or a light emitting diode. Optics system 415 includes one or more optical components that condition the light from source 410. Conditioning light from source 410 may include, e.g., expanding, collimating, and/or adjusting orientation in accordance with instructions from controller 330. The one or more optical components may include one or more lenses, liquid lenses, mirrors, apertures, and/or gratings. In some embodiments, optics system 415 includes a liquid lens with a plurality of electrodes that allows scanning of a beam of light with a threshold value of scanning angle to shift the beam of light to a region outside the liquid lens. Light emitted from the optics system 415 (and also source assembly 310) is referred to as image light 355.

Output waveguide 320 receives image light 355. Coupling element 350 couples image light 355 from source assembly 310 into output waveguide 320. In embodiments where coupling element 350 is diffraction grating, a pitch of the diffraction grating is chosen such that total internal reflection occurs in output waveguide 320, and image light 355 propagates internally in output waveguide 320 (e.g., by total internal reflection), toward decoupling element 365.

Directing element 360 redirects image light 355 toward decoupling element 365 for decoupling from output waveguide 320. In embodiments where directing element 360 is a diffraction grating, the pitch of the diffraction grating is chosen to cause incident image light 355 to exit output waveguide 320 at angle(s) of inclination relative to a surface of decoupling element 365.

In some embodiments, directing element 360 and/or decoupling element 365 are structurally similar. Expanded image light 340 exiting output waveguide 320 is expanded along one or more dimensions (e.g., may be elongated along x-dimension). In some embodiments, waveguide display 300 includes a plurality of source assemblies 310 and a plurality of output waveguides 320. Each of source assemblies 310 emits a monochromatic image light of a specific band of wavelength corresponding to a primary color (e.g., red, green, or blue). Each of output waveguides 320 may be stacked together with a distance of separation to output an expanded image light 340 that is multi-colored.

Figure 5A:
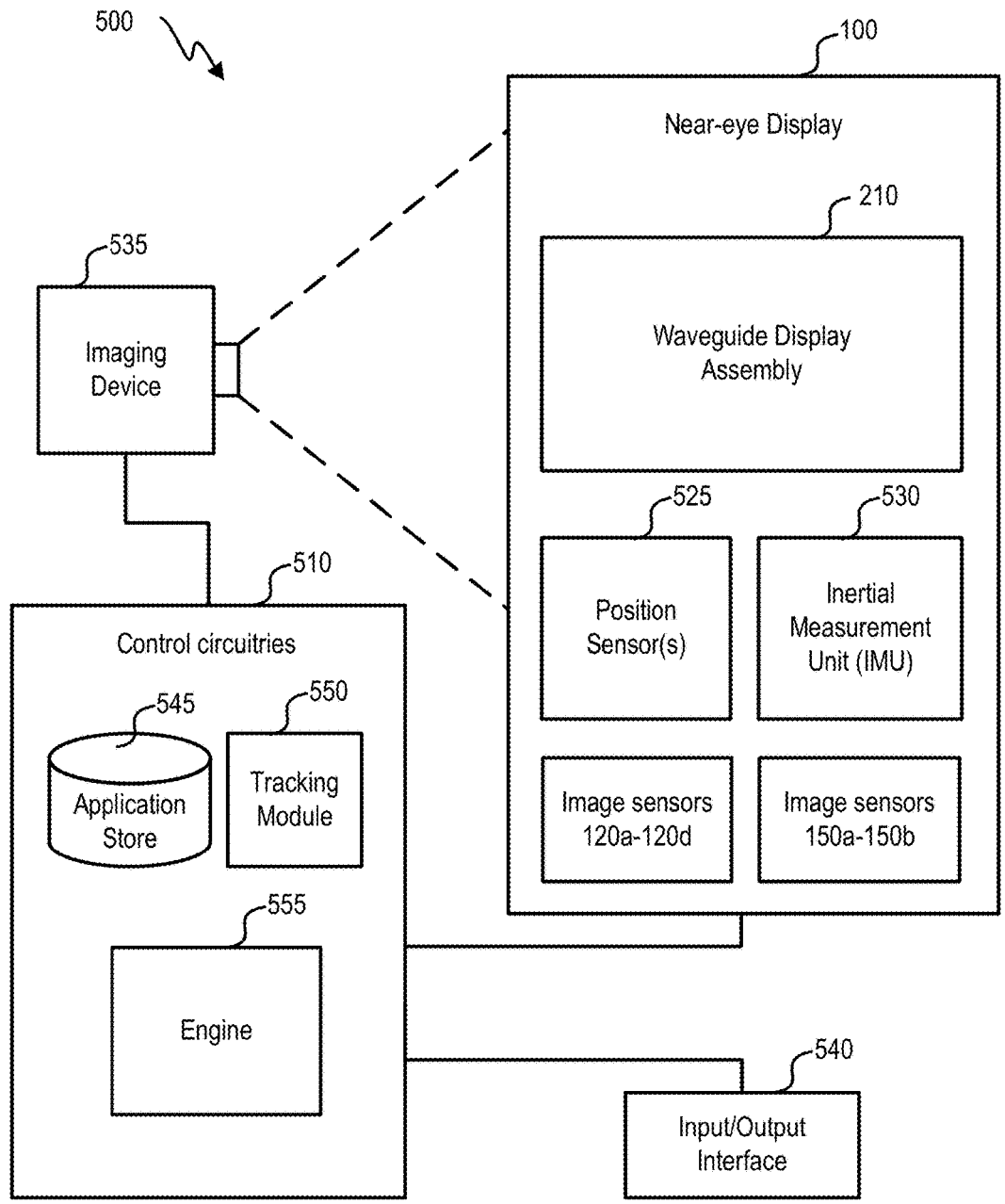
FIGS. 5A, 5B, 5C, and 5D are block diagrams of an example of a system including the near-eye display.

FIG. 5A is a block diagram of an embodiment of a system 500 including the near-eye display 100. The system 500 comprises control circuitries 510, an imaging device 535, and an input/output interface 540. Each of imaging device 535 and input/output interface 540 is coupled to control circuitries 510. System 500 can be configured as a head-mounted device, a wearable device, etc.

Imaging device 535 includes near-eye display 100, which is a display that presents media to a user. Examples of media presented by the near-eye display 100 include one or more images, video, and/or audio. In some embodiments, audio is presented via an external device (e.g., speakers and/or headphones) that receives audio information from near-eye display 100 and/or control circuitries 510 and presents audio data based on the audio information to a user. In some embodiments, near-eye display 100 may also act as an AR eyewear glass. In some embodiments, near-eye display 100 augments views of a physical, real-world environment, with computer-generated elements (e.g., images, video, sound, etc.).

Near-eye display 100 includes waveguide display assembly 210, image sensors 120a-120d and 150a-150b, one or more position sensors 525, and/or an inertial measurement unit (IMU) 530. Waveguide display assembly 210 includes source assembly 310, output waveguide 320, and controller 380 as depicted in FIG. 3. IMU 530 is an electronic device that generates fast calibration data indicating an estimated position of near-eye display 100 relative to an initial position of near-eye display 100 based on measurement signals received from one or more of position sensors 525. The estimation of the position of near-eye display 100 can also be based on or augmented by image data from image sensors 120a-120d of FIG. 1A, which can generate image data of a physical environment in which the user (and near-eye display 100) is located. Further, image sensors 150a-150b of FIG. 1B may generate image data for determining a gaze point of the user, to identify an object of interest of the user.

The input/output interface 540 is a device that allows a user to send action requests to the control circuitries 510. An action request is a request to perform a particular action. For example, an action request may be to start or end an application or to perform a particular action within the application.

Control circuitries 510 provides media to near-eye display 100 for presentation to the user in accordance with information received from one or more of: imaging device 535, near-eye display 100, and input/output interface 540. In some examples, control circuitries 510 can be housed within system 500 configured as a head-mounted device. In some examples, control circuitries 510 can be a standalone console device communicatively coupled with other components of system 500. In the example shown in FIG. 5A, control circuitries 510 include an application store 545, a tracking module 550, and an engine 555.

Application store 545 stores one or more applications for execution by the control circuitries 510. An application is a group of instructions, that, when executed by a processor, generates content for presentation to the user. Examples of applications include: gaming applications, conferencing applications, video playback application, or other suitable applications.

Tracking module 550 calibrates system 500 using one or more calibration parameters and may adjust one or more calibration parameters to reduce error in determination of the position of the near-eye display 100. Moreover, tracking module 550 tracks movements of near-eye display 100 using slow calibration information from the imaging device 535. Tracking module 550 also determines positions of a reference point of near-eye display 100 using position information from the fast calibration information.

Engine 555 executes applications within system 500 and receives position information, acceleration information, velocity information, and/or predicted future positions of near-eye display 100 from tracking module 550. In some embodiments, information received by engine 555 may be used for producing a signal (e.g., display instructions) to waveguide display assembly 210 that determines a type of content presented to the user. For example, to provide an interactive experience, engine 555 may determine the content to be presented to the user based on a location of the user (e.g., provided by tracking module 550), a gaze point of the user (e.g., based on image data provided by imaging device 535), a distance between an object and user (e.g., based on image data provided by imaging device 535), etc.

In some examples, an optical link can be provided as part of system 500 to facilitate high speed transmission of sensor data. The optical link can be shared among image sensors 120a-120d and 150a-150b, position sensor(s) 525, and IMU 530 to form a sensor network. The sensor network can be coupled with control circuitries 510 to allow each sensor of the network to transmit sensor data to control circuitries 510. By providing an optical link shared among the sensors instead of point-to-point connection for each sensor, the electrical wirings and the associated I/O interface circuitries can be substantially reduced, which allows the sensor network to be more compact and requires much lower power to operate, while providing a superior data transmission rate (compared with electrical wires). All these can facilitate the integration of multiple sensors in a wearable device, as well as the high speed transmission and processing of large volume of sensor data from the multiple sensors, to improve user experience.

Figure 5B:
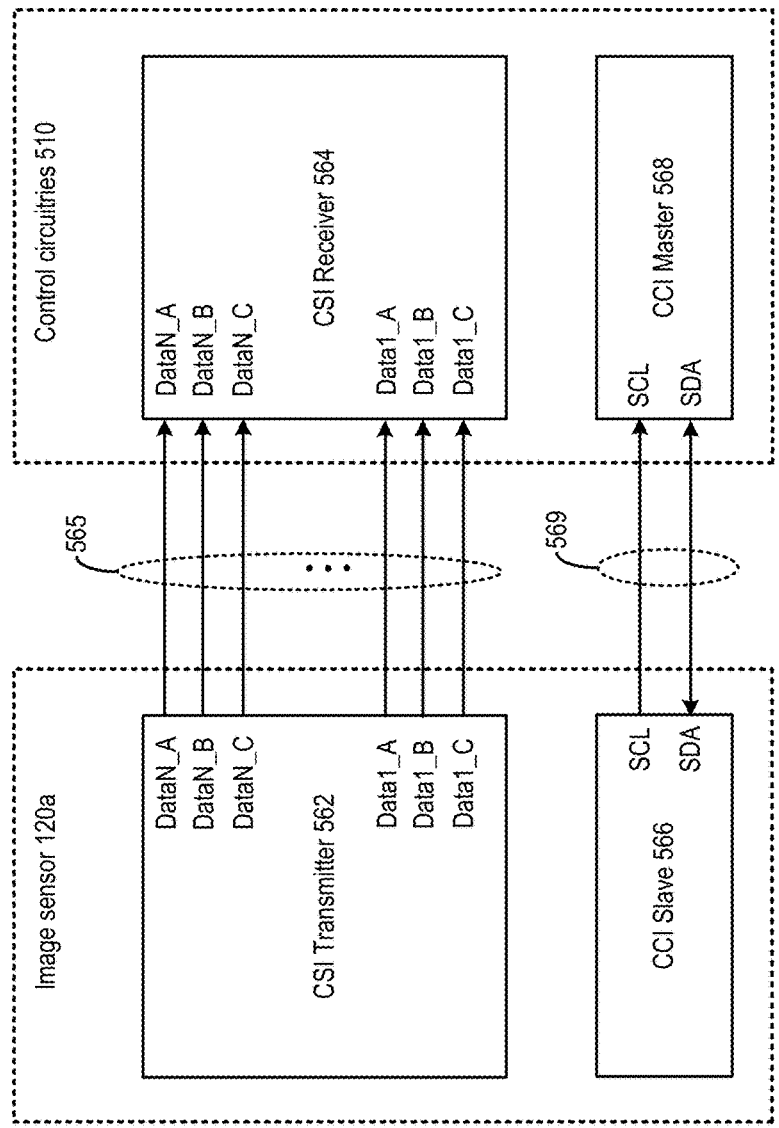
Figure 5C:
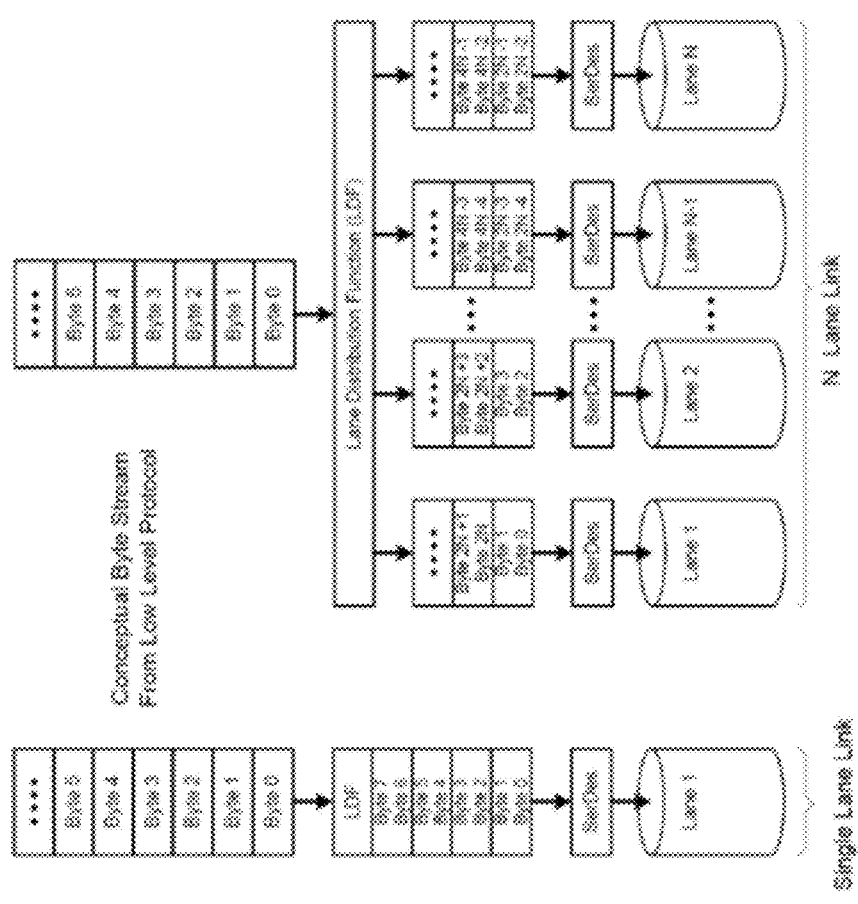

FIG. 5B and FIG. 5C illustrate an example of a MIPI C-PHY interface 560 that can be used to support transmission of data from an image sensor (e.g., image sensor 120a) to control circuitries 510 (e.g., to be received by engine 555 for processing). MIPI C-PHY interface 560 may include a camera serial interface (CSI) transmitter 562 on the side of image sensor 120a and a CSI receiver 564 on the side of control circuitries 510. An unidirectional high speed data link 565 can be formed between CSI transmitter 562 and CSI receiver 564 for transmission of pixel data from image sensor 120a to control circuitries 510. In the example of FIG. 5B, high speed data link 565 can include multiple data lanes. In some other examples, high speed data link 565 can also include a single data lane. Referring to FIG. 5C, in a case where high speed data link 565 comprises a single data lane, CSI transmitter 562 can receive a stream of pixel data bytes from image sensor 120a. A lane distribution function (LDF) block can buffer the stream of pixel data bytes, and transmit, using a transmitter circuit (labelled "SerDes"), the data bytes via the single data lane. In some examples, the data bytes can be transmitted sequentially in groups of two bytes. On the other hand, in a case where high speed data link 565 includes N data lanes, the LDF block can distribute the data bytes among the multiple data lanes in a round-robin fashion. In the example of FIG. 5C, a first group of two bytes (bytes 0 and 1) can be transmitted using data lane 1, a second group of two bytes (bytes 2 and 3) can be transmitted using data lane 2, and an N-th group of two bytes (bytes 2N−2 and 2N−1) can be transmitted using data lane N. In a case where interface 560 is an MIPI D-PHY interface, groups of four bytes can be transmitted. Each data lane may include multiple wires. In the example of FIG. 5B, each data lane of high speed data link 565 may include three wires, and each data lane can support parallel transmission of three sets of data for transmission of a pixel data byte stream. In some examples, a MIPI PHY interface (e.g., MIPI D-PHY) may also include a clock lane (not shown in FIG. 5B) to provide synchronization between a CSI transmitter and a CSI receiver. In some examples, the MIPI PHY interface may include no dedicated clock lane, and the pixel data transmitted via the data lanes can be encoded based on a self-clocking signal encoding scheme to include synchronization information.

Moreover, MIPI C-PHY interface 560 also includes a camera control interface (CCI) including a CCI slave 566 on the side of image sensor and a CCI master 568 on the side of control circuitries 510. CCI enables control circuitries 510 (e.g., engine 510) to configure and/or control image sensor 120a (e.g., to update various configuration settings of image sensor 120a, to control image sensor 120a to transmit image data at a certain time, etc.). A bidirectional control link 569 can be formed between CCI slave 566 and CCI master 568. Bidirectional control link 569 may include a clock line (between SCL ports of CCI slave 566 and CCI master 568) and one or more data lines (between SDA ports of CCI slave 566 and CCI master 568). The bi-directional control link can be implemented as Inter-Integrated Circuit ($I^2C$) buses based on, for example, the I2C and/or I3C standards.

In a case where multiple image sensors (e.g., image sensors 120a-120d) are connected with control circuitries 510 using MIPI C-PHY interface, multiple instances of MIPI C-PHY interface 560 can be included between the multiple image sensors and control circuitries 510 to form a point-to-point connection between control circuitries 510 and each image sensor.

Figure 5D:
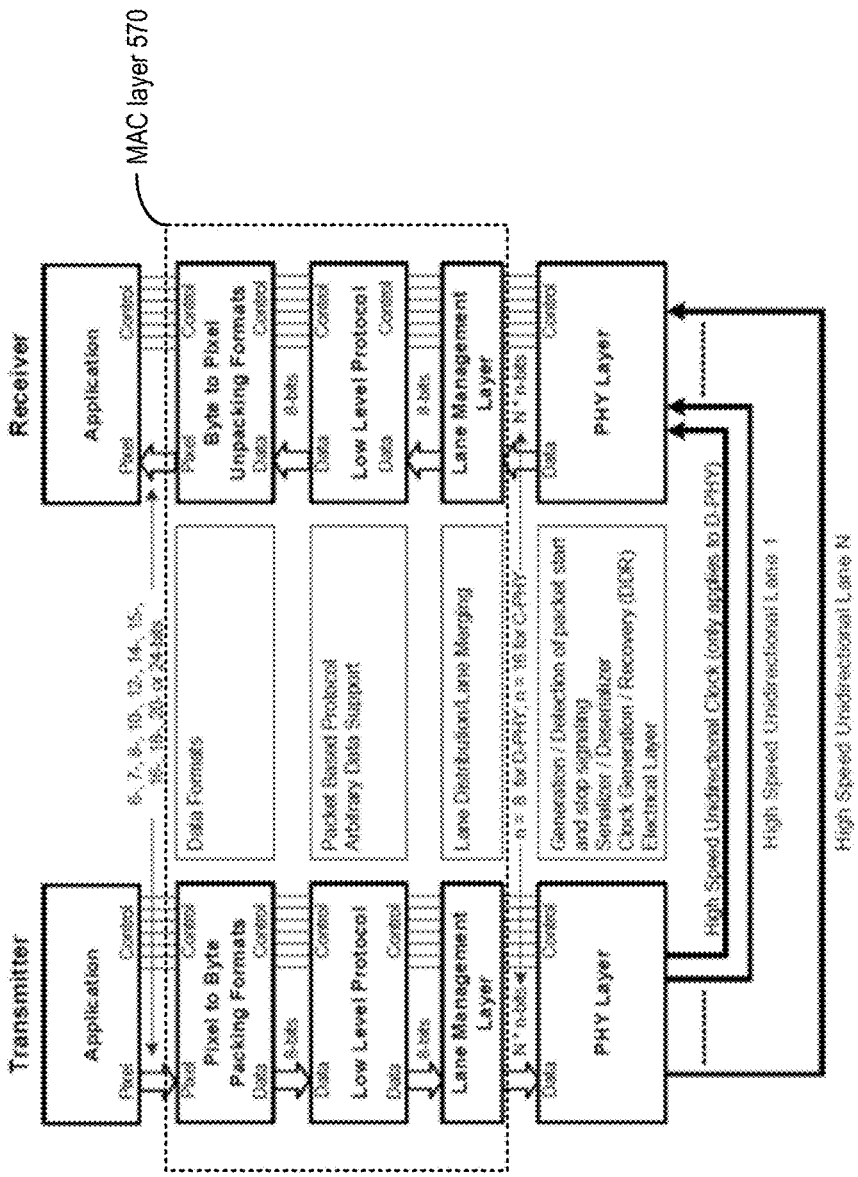

FIG. 5D illustrates an example of a CSI-2 system stack diagram. The system stack diagram shows the processing components of a media control access (MAC) layer 570 between an application (e.g., an application from application store 545) and the PHY layer (e.g., MIPI C-PHY interface 560) involved in the transmission and reception of pixel data on the transmitter side and on the receiver side. On the transmitter side, pixel data generated by an application (e.g., based on sensor data generated by image sensor 120*a*) can be packaged into data bytes based on a pre-determined data format. The stream of data bytes can be buffered at a lane management layer which includes the LDF of FIG. 5C to distribute the data bytes among multiple data lanes or to send the data bytes via a single data lane. On the receiver side, the data bytes can be collected and unpackaged to obtain the pixel data, which can then be provided to another application (e.g., a SLAM algorithm) for further processing.

Figure 6:
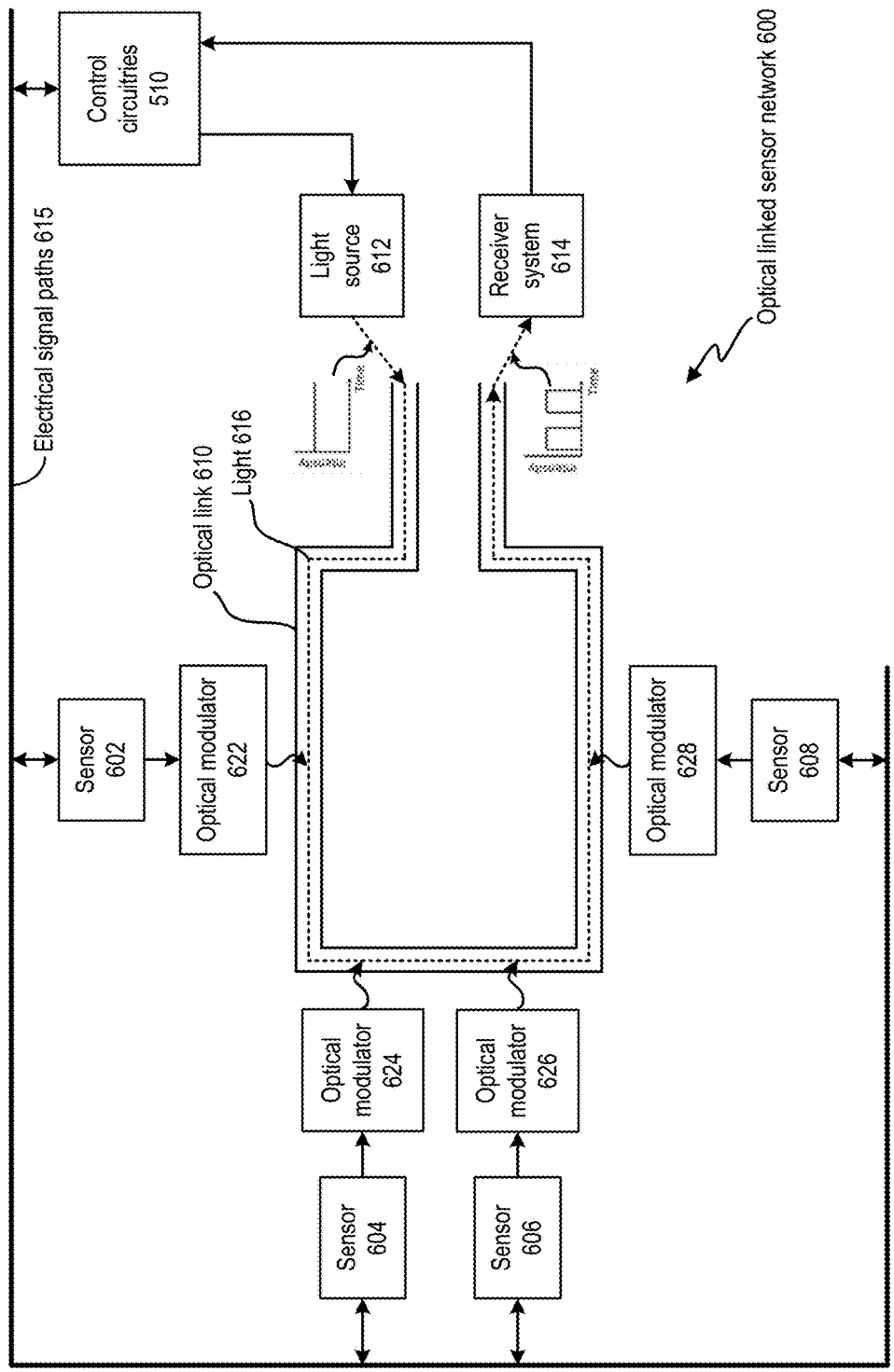
FIG. 6 is a block diagram of an example of an optical linked sensor network that can be used in the example system of FIG. 5A.

FIG. 6 illustrates an example of an optical linked sensor network 600, which can be used in lieu of the MIPI PHY layer (e.g., PHY layer of FIG. 5D). In some examples, optical linked sensor network 600 can perform the data transmission function of a MIPI PHY layer and is compatible with MAC layer 570 of FIG. 5D. Optical linked sensor network 600 can be part of system 500. Optical linked sensor network 600 includes a plurality of sensors 602, 604, 606, and 608, an optical link 610 coupled between a light source 612 and a receiver system 614, and one or more electrical signal paths 615. Sensors 602, 604, 606, and 608 can be, for example, image sensors 120*a*-120*d* and 150*a*-150*b*, position sensors 525, IMU 530, etc. Both light source 612 and receiver system 614 can be coupled with control circuitries 510. Light source 612 can be operated by control circuitries 510 to generate light 616, which travels through optical link 610 to reach receiver system 614. Light 616 can be modulated for transmission of data to control circuitries 510. Although FIG. 6 illustrates a single optical link 610, it is understood that multiple optical links in addition to optical link 610 can be included in system 500. For example, each additional optical link can represent an additional data lane to further increase the rate of transmission of sensor data to control circuitries 510. Moreover, as to be discussed in more details below, a single optical link 610 can also be used to provide the data transmission function of multiple data lanes.

Optical link 610 can be shared among the plurality of sensors 602, 604, 606, and 608 for transmission of sensor data to control circuitries 510. As such, optical link 610 can provide a shared physical medium over which one or more communication channels can be provided to each of sensors 602, 604, 606, and 608 to transmit data to control circuitries 510. Each of sensors 602, 604, 606, and 608 may be coupled with optical link 610 via, respectively, optical modulators 622, 624, 626, and 628. Each of optical modulators 622, 624, 626, and 628 may be associated with, respectively, sensors 602, 604, 606, and 608 to modulate light 616 propagating at a certain location within optical link 610. The modulation can be in different forms. In some examples, amplitude modulation can be used to introduce an intensity pattern in light 616 to transmit the sensor data. In some examples, phase modulation can be used to introduce a pattern of phase changes in light 616 to transmit the sensor data. In some examples, a combination of phase and amplitude modulation schemes (e.g., quadrature phase-shift keying (QPSK), quadrature amplitude modulation (QAM), orthogonal frequency-division multiplexing (QFDM), etc.) can be used to modulate light 616 to transmit the sensor data. Receiver system 614 may include a photodetector (e.g., a photodiode) and other circuitries (e.g., demodulators, oscillators, mixers, etc.) to convert the modulated light 616 to electrical signals representing the sensor data. The sensor data can then be provided to control circuitries 510 for further processing (e.g., to track a location of system 500, a direction of gaze of the user, etc.). In some examples, each sensor can be configured to generate data packets conforming to a MIPI protocol (e.g., Camera Serial Interface (CSI)), which enables control circuitries 510 to process the data packets based on the MIPI protocol. With such arrangements, sensors and processing circuitries that are interoperable according to the MIPI specification can be integrated easily using optical link 610 instead of a MIPI physical layer which typically requires point-to-point connection between each sensor and control circuitries 510 as discussed above.

Figure 7:
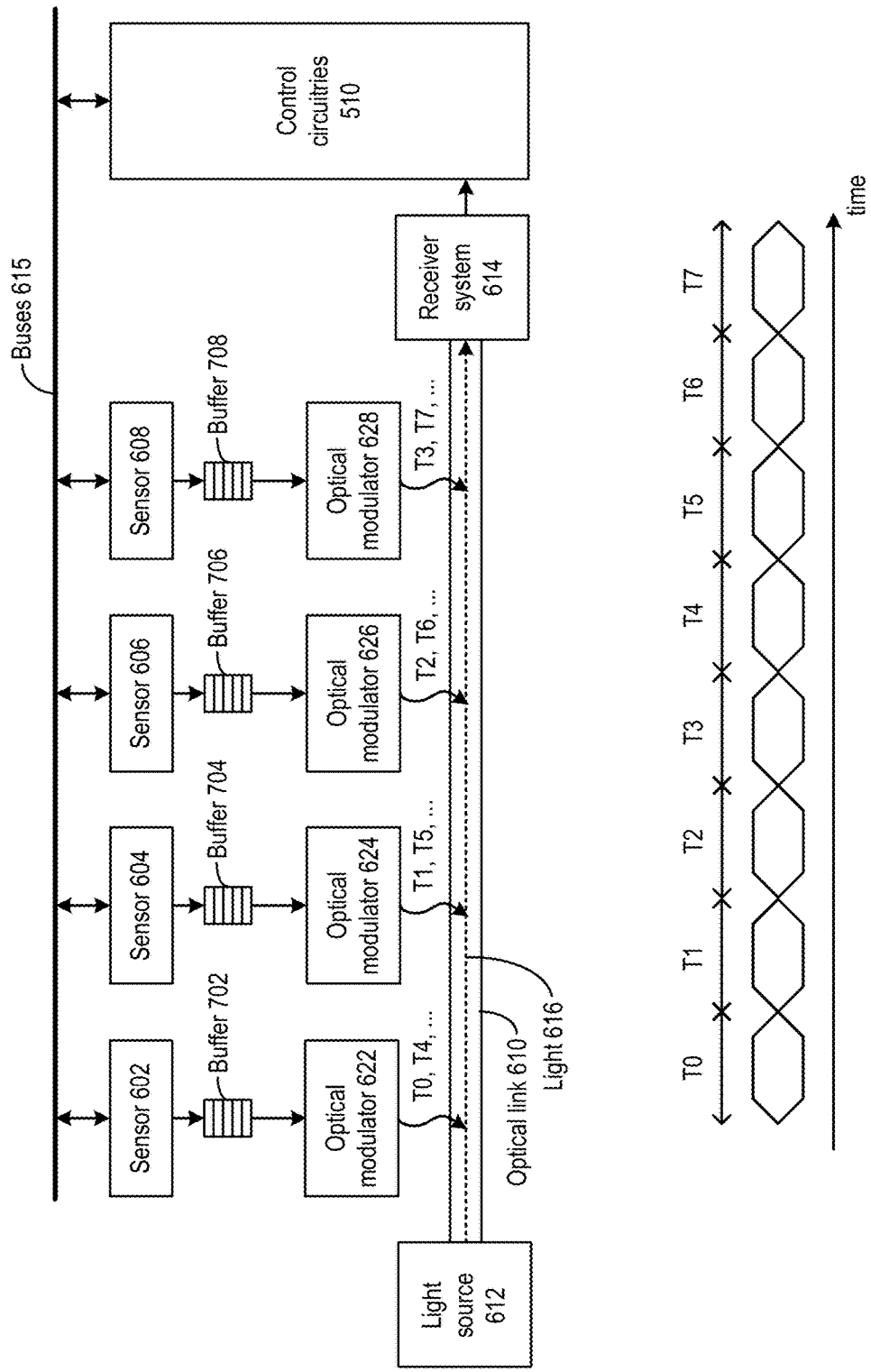
FIG. 7 is a block diagram illustrating a time-division multiple access (TDMA) scheme operable on the optical linked sensor network of FIG. 6.

There are different ways by which sensors 602, 604, 606, and 608 can share optical link 610 to transmit sensor data to control circuitries 510. In one example, sensors 602, 604, 606, and 608 can be configured to share optical link 610 based on a time-division multiple access (TDMA) scheme. Reference is now made to FIG. 7, which illustrates an example of a TDMA scheme. In the example of FIG. 7, each of optical modulators 622, 624, 626, and 628 (and the associated sensors 602, 604, 606, and 608) can be assigned different time slots to modulate light 616 to transmit sensor data. For example, optical modulator 622 can be scheduled to modulate light 616 at time T0. Optical modulator 624 can be scheduled to modulate light 616 at time T1. Optical modulator 626 can be scheduled to modulate light 616 at time T2. Optical modulator 628 can be scheduled to modulate light 616 at time T3. The scheduling can be in a round-robin fashion. For example, after optical modulator 628 completes transmission of sensor data at time T3, optical modulator 622 can be scheduled to modulate light 616 at time T4, followed by modulator 624 at time T5, etc. Each of sensors 602, 604, 606, and 608 may be coupled with, respectively, buffers 702, 704, 706, and 708, to store sensor data generated by a sensor between the time slots when the sensor is scheduled to transmit sensor data (and when the associated optical modulator is scheduled to modulate light 616 based on the sensor data). For example, buffer 702 can be used to accumulate sensor data generated by sensor 602 at times T1, T2, and T3. The accumulated sensor data at buffer 702 can then transmitted at time T4, and buffer 702 can be emptied to store another set of sensor data generated subsequently.

In the example of FIG. 7, the TDMA scheme allows optical link 610 to perform the data transmission function of a four-lane MIPI D-PHY. For example, in a case the LDF of FIG. 5D is to distribute the data byte stream received from sensors 602, 604, 606, and 608 among four data lanes, the LDF may transmit four groups of bytes (e.g., each group includes two bytes for C-PHY) to be transmitted in four data lanes to optical modulators 622, 624, 626, and 628. Each optical modulator can receive a group of bytes and transmit the group of bytes in the time slot allocated to the optical modulator. In the simplest case, a two-lane MIPI D-PHY can be implemented in optical link 610 with a TDMA scheme where light 616 of a single wavelength can be modulated alternately by the data of the first data lane and by the data of the second data lane. The data transmitted may also be encoded based on a self-clocking signal encoding scheme to include synchronization information, such that a separate clock transmission is not required.

In some examples, as part of the TDMA scheme, some sensors can also be prioritized over others. For example, different sensors can be allocated with different durations of data transmission time and wait time based on, for example, a volume of data to be transmitted, a criticality of the data, etc. For example, in a case where sensor 602 is an image sensor and sensor 604 is a location sensor, and that sensor 602 generates a larger volume of sensor data per unit time compared with sensor 604, the duration of time T0 allocated to sensor 602 can be longer than the duration of time T1 allocated to sensor 604. Moreover, the image data from sensor 602 may be deemed to be more time-sensitive than the location data from sensor 604 (e.g., due to a higher acquisition rate) and are given a higher priority. As a result, sensor 602 may be scheduled to transmit the image data before sensor 604 transmits the location data, and sensor 602 may wait for a shorter duration than sensor 604 before transmitting the image data.

In some examples, the scheduling can be performed by control circuitries 510, and the scheduling information can be communicated to each of sensors 602, 604, 606, and 608 via electrical signal paths 615. In some examples, control circuitries 510 can also assign an identifier to each of sensors 602, 604, 606, and 608, each of which can include its assigned identifier in the sensor data transmission. Control circuitries 510 can then identify which sensor generates the received sensor data based on the time of receiving the sensor data, the identifier information included in the sensor data, or a combination of both. For example, each of the scheduled times T0, T1, T2, T4, etc., can be represented by a set of reference count values. Control circuitries 510 can associate the reference count values with each of sensors 602, 604, 606, and 608, and transmit the counter values corresponding to times T0, T1, T2, T3, etc., to sensors 602, 604, 606, and 608. Each of control circuitries 510 and sensors 602, 605, 606, and 608 can also maintain a free-running counter clocked by a common clock signal generated by control circuitries 510 and transmitted to each of the sensors. Each sensor can initiate transmission of sensor data when the output of the free-running counter at the sensor matches the stored reference count values, which indicates that the allocated time slot of transmission has arrived. Moreover, control circuitries 510, upon receiving the sensor data from receiver device system 614, can determine the source of the sensor data by matching the output of the free-running counter at control circuitries 510 with the stored reference count values associated with the sensors, and/or based on the identifier information included in the sensor data. Control circuitries 510 can perform pre-determined processing of the sensor data based on the determined source. For example, if the sensor data are image data from sensors 120a-120d, control circuitries 510 can process the sensor data for location tracking. Also, if the sensor data are image data from sensors 150a-150b, control circuitries 510 can process the sensor data for gaze direction determination.

In the TDMA scheme of FIG. 7, each of optical modulators 622, 624, 626, and 628 may be configured to modulate a single frequency component of light 616 associated with a particular range of wavelength, and each modulator (associated with a respective sensor) takes turn in modulating that single frequency component. In some examples to reduce the wait time and increase the rate of data transmission, sensors 602, 604, 606, and 608 can also be configured to share optical link 610 based on a wavelength-division multiple access (WDMA) scheme, which allows each sensor to use a dedicated frequency component of light 616 to transmit sensor data simultaneously, and the wait time can be reduced (or otherwise eliminated) for each sensor.

Figure 8:
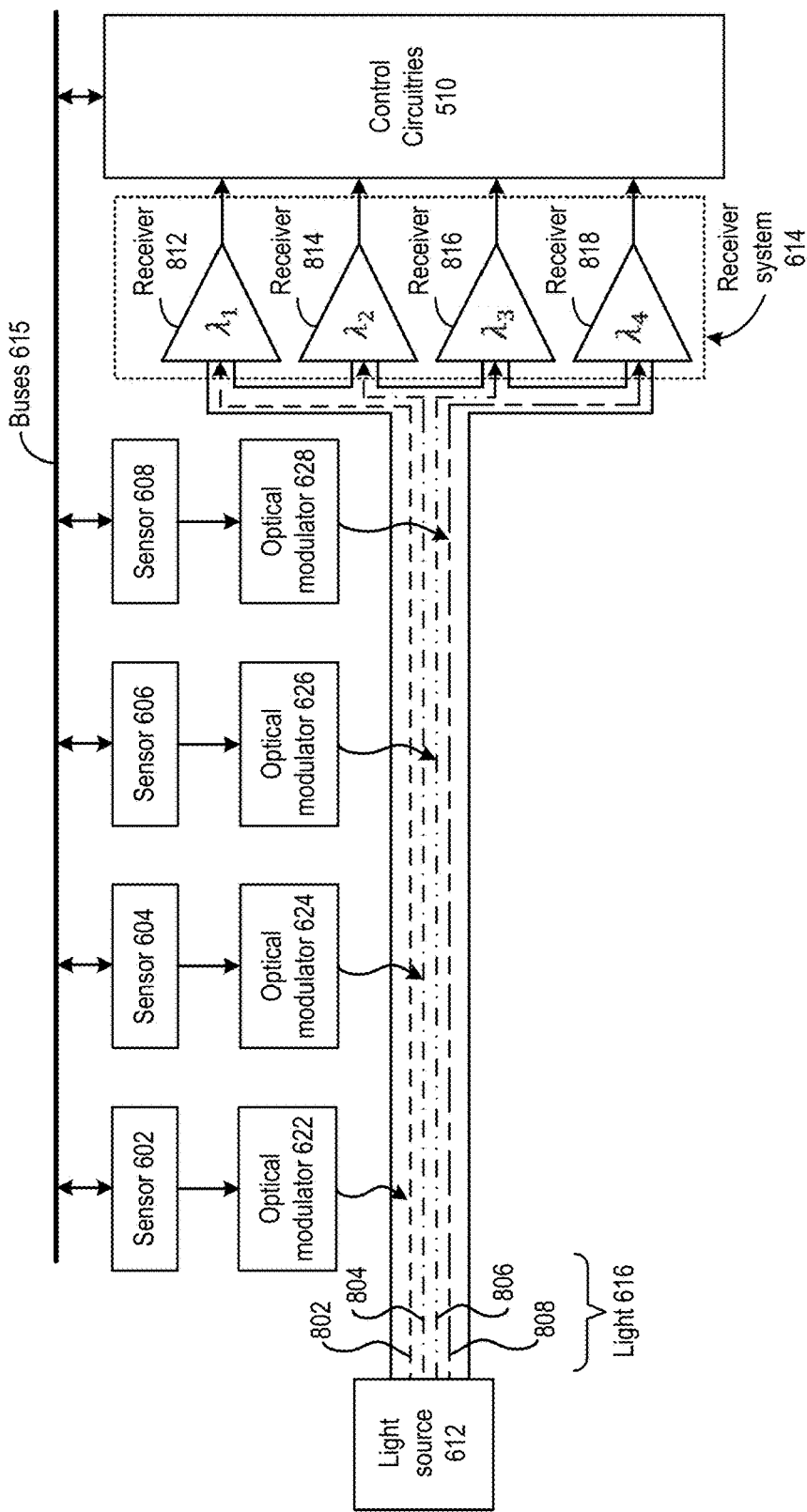
FIG. 8 is a block diagram illustrating a wavelength-division multiple access (WDMA) scheme operable on the optical linked sensor network of FIG. 6.

Reference is now made to FIG. 8, which illustrates an example of a WDMA scheme. In the example of FIG. 8, light source 612 may be configured to generate light 616 including a plurality of frequency components, with each frequency component being associated with a particular wavelength/frequency range. For example, as shown in FIG. 8, light 616 may include a first frequency component 802 associated with wavelength $\lambda_1$, a second frequency component 804 associated with wavelength $\lambda_2$, a third frequency component 806 associated with wavelength $\lambda_3$, and a fourth frequency component 808 associated with wavelength $\lambda_4$. Each of sensors 602, 604, 606, and 608 can be assigned to use one of the first, second, third, and fourth frequency components 602-608 for data transmission. For example, based on the assignment, optical modulator 622 may be configured to modulate first frequency component 802 based on sensor data generated by sensor 602, optical modulator 624 may be configured to modulate second frequency component 804 based on sensor data generated by sensor 604, optical modulator 626 may be configured to modulate third frequency component 806 based on sensor data generated by sensor 606, whereas optical modulator 628 may be configured to modulate fourth frequency component 808.

The WDMA scheme can perform the data transmission function of a multi-lane MIPI PHY interface as well. For example, each frequency component can correspond to one data lane. In a case the LDF of FIG. 5D is to distribute the data byte stream received from sensors 602, 604, 606, and 608 among four data lanes, the LDF may transmit four groups of bytes (e.g., each group includes two bytes for C-PHY) to be transmitted in four data lanes to optical modulators 622, 624, 626, and 628. Each optical modulator can receive a group of bytes and transmit the group of bytes using the assigned frequency component. The data transmitted may also be encoded based on a self-clocking signal encoding scheme to include synchronization information, such that a separate clock transmission is not required.

On the receiver side, receiver system 614 may include a set of receivers 812, 814, 816, and 818, with each receiver configured to process one of the first, second, third, and fourth frequency components 602-608. For example, receiver 812 may be configured to process first frequency component 802 that carries sensor data from sensor 602, receiver 814 may be configured to process second frequency component 804 that carries sensor data from sensor 604, receiver 816 may be configured to process third frequency component 806 that carries sensor data from sensor 606, and receiver 818 may be configured to process fourth frequency component 808 that carries sensor data from sensor 608. Each of receivers 812, 814, 816, and 818 also includes a photodetector (e.g., a photodiode) to convert the modulated frequency components to electrical signals representing the sensor data. The sensor data can then be provided to control circuitries 510 for further processing (e.g., to track a location of system 500, a direction of gaze of the user, etc.). Control circuitries 510 can maintain a mapping between the receivers and the sensors based on the frequency component assignment, and perform different pre-determined processing for sensor data provided by different receivers (and originated from different sensors), as discussed above.

In some examples, the sensors of optical linked sensor network 600 can also share optical link 610 based on a combination of the aforementioned TDMA and WDMA schemes. For example, to prioritize the data transmission by certain sensors, each sensor with higher priority can be assigned a dedicated frequency component of light 616 for data transmission based on a WDMA scheme, whereas sensors with lower priority can be configured to time-share a single frequency component of light 616 based on a TDMA scheme. As another example, optical linked sensor network 600 can switch between a WDMA scheme and a TDMA scheme based on a mode of operation. For example, under a low power mode, the image sensors can be configured to generate images with lower resolution and at a lower frame rate. In this mode, optical link 610 can be operated under a TDMA scheme, where each image sensor takes turns in using a single frequency component of light 616 to transmit the image data, based on the lower bandwidth requirement. On the other hand, under a high power mode, the image sensors can be configured to generate images with higher resolution and at a higher frame rate, and optical link 610 can be operated under a WDMA scheme, where each image sensor uses a dedicated frequency component of light 616 to transmit the image data, based on the higher bandwidth requirement. The switching between lower power mode and high power mode can be based on, for example, a state of motion of the wearable device (e.g., a HMD) that incorporates optical linked sensor network 600. As an example, if control circuitries 510 determines that the wearable device remains static for a pre-determined time duration, control circuitries 510 may configure sensors 602, 604, 606, and 608, as well as receiver system 614, to operate based on a TDMA scheme. In such a case, control circuitries 510 may configure the sensors to time-share a single frequency component (e.g., first frequency component 802 associated with wavelength $\lambda_1$) for data transmission, and enable receiver 812 for receiving and processing that frequency component. Control circuitries 510 can also disable receivers 814, 816, and 818 under the TDMA scheme.

Referring back to FIG. 6, optical linked sensor network 600 further includes one or more electrical signal paths 615. Electrical signal paths 615 can include buses used for transmission of control signals and clock signals from control circuitries 510 to each of sensors 602, 604, 606, and 608. For example, control circuitries 510 can transmit scheduling information (e.g., reference counter values) to each sensor using electrical signal paths 615. Control circuitries 510 can also transmit clock signals using electrical signal paths 615 to synchronize between the data transmission operation at each sensor and the data recovery operation at receiver system 614. In some examples, electrical signal paths may include Inter-Integrated Circuit (I²C) buses.

In some examples, optical link 610 may include a plurality of waveguides to provide a propagation path for light 616 between light source 612 and receiver system 614. Each waveguide may include a silicon waveguide, which can be integrated with, and associated with, a silicon optical modulator (e.g., one of optical modulators 622, 624, 626, or 628) on a silicon photonic die. Each silicon photonic die can include one or more silicon waveguides and one or more optical modulators associated with the one or more silicon waveguides. One or more sensor devices (e.g., pixel arrays, microelectromechanical systems (MEMS), etc.) as well as interfacing and processing circuitries can be coupled with a silicon photonic die to form a single chip. In some examples, the sensor devices can be integrated with the one or more silicon optical modulators and the one or more silicon waveguides on the silicon photonic die to form a single silicon chip. In some examples, the sensor devices can be integrated on a sensor die. The sensor die and the silicon photonic die can be coupled together to form a vertical stack. The vertical stack can be housed within a chip package to form a single chip. A vertical stack may be preferable for image sensors to maximize the available area for pixel array on the wearable device. By incorporating a larger pixel array with more pixels, the resolution of images generated by the image sensor can be increased.

Figure 9:
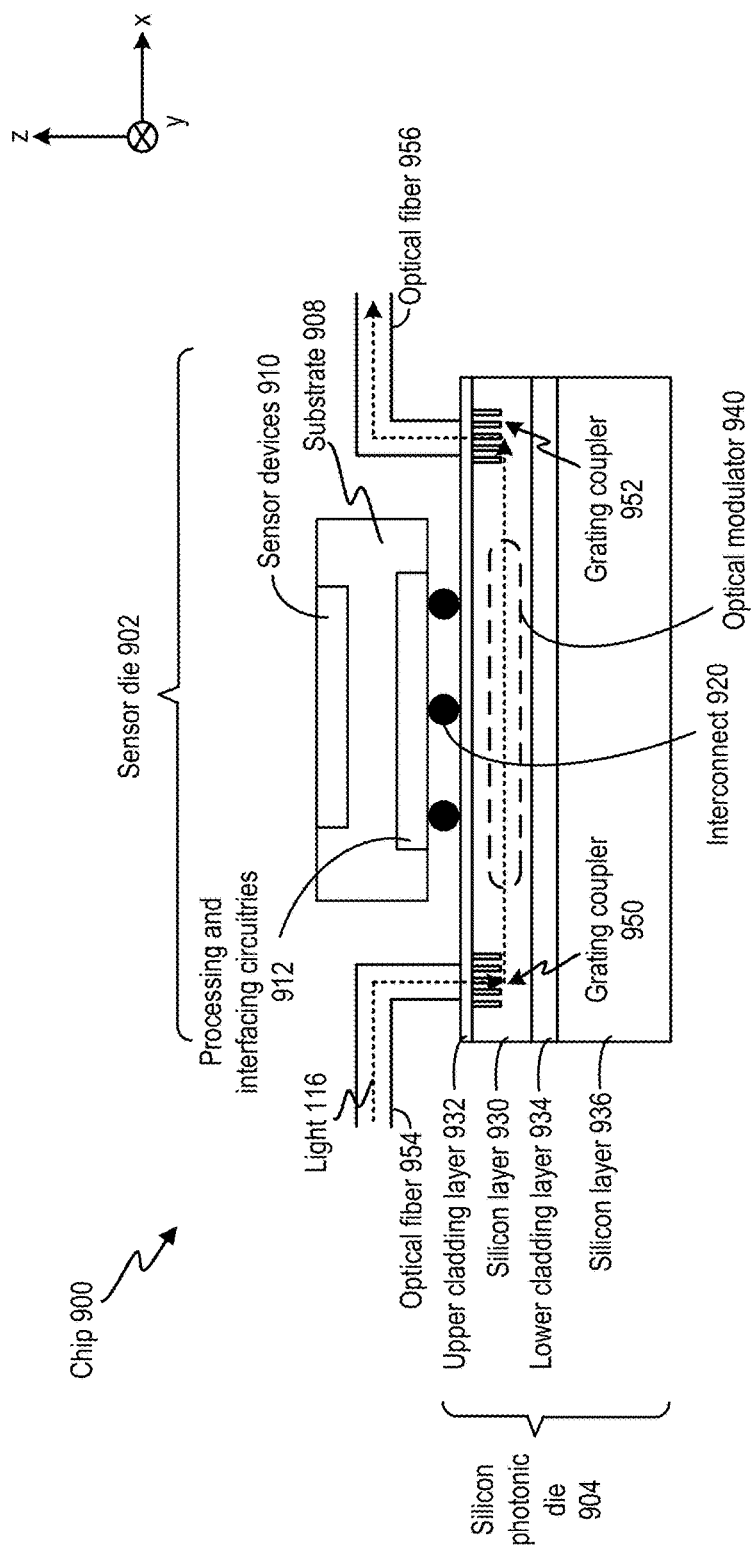
FIG. 9 is a side-view of an example of a component of the optical linked sensor network of FIG. 6.

Reference is now made to FIG. 9, which illustrates a cross-section view of an example of a chip 900 that can be part of optically linked sensor network 600 of FIG. 6. Chip 900 includes a sensor die 902 and a silicon photonic die 904. Sensor die 902 may include a semiconductor substrate 908 (e.g., a silicon substrate, a silicon germanium substrate, etc.) in which one or more sensor devices 910 (e.g., pixel arrays, microelectromechanical systems (MEMS), etc.) as well as processing and interfacing circuitries 912 may be formed. Sensor die 902 may form a vertical stack structure with silicon photonic die 904. Interconnect 920 can be provided to allow transmission of signals and power between sensor die 902 and silicon photonic die 904. Interconnect 920 can include, for example, Through-silicon-via (TSV), micro bump interconnection, wire-bound, controlled collapse chip connection (C4), etc.

Silicon photonic die 904 may include a silicon layer 930, an upper cladding layer 932, a lower cladding layer 934, and a silicon substrate 936. Silicon layer 930 can be configured as a silicon-on-insulator (SOI) layer to include a silicon waveguide for propagating light 616 along the x direction. Silicon layer 930 is sandwiched between upper cladding layer 932 and lower cladding layer 934. The two cladding layers may include, for example, silicon dioxide, or other materials with a lower refractive index than silicon layer 930. The cladding layers can be provided to confine light 616 within silicon layer 930. In addition, silicon layer 930 may also include an optical modulator 940 adjacent to the silicon waveguide (e.g., along the y direction). As to be discussed in more detail below, optical modulator 940 can be controlled by, for example, processing and interfacing circuitries 912 of sensor die 902 to modulate light 616 when light 616 propagates in the silicon waveguide of silicon layer 930.

In some examples, processing and interfacing circuitries 912 may include analog to digital converter (ADC) circuits configured to convert analog electrical signals representing the sensor data generated by sensor devices 910 (e.g., a voltage and/or a current representing an intensity of light detected at a pixel cell, a voltage and/or a current representing a degree of movement of one or more components of the MEMS, etc.) into digital codes. The digital codes can be provided to optical modulator 940 in the form of electrical control signals. Optical modulator 940 can then modulate light 616 based on the electrical control signals. For example, optical modulator 940 can modulate light 616 sequentially (with respect to time) according to the digital codes. In some examples, the ADC circuits can also be in silicon photonic die 904. In that case, sensor die 902 can transmit the analog electrical signals representing the sensor data generated by sensor devices 910 to the ADC in silicon photonic die 904. The ADC in silicon photonic die 904 can convert the analog electrical signals to digital codes and provide the digital codes to optical modulator 940. In some examples, processing and interfacing circuitries 912 may include a buffer to store the digital codes representing sensor data collected within a period of time when chip 900 is not scheduled to transmit the sensor data over the optical link (e.g., in the TDMA scheme as described above).

The silicon waveguide of silicon layer 930 can be coupled with the silicon waveguides of other chips to form optical link 610. The coupling can be through fiber optics. As shown in FIG. 9, silicon photonic die 904 may include a pair of grating couplers 950 and 952. Grating coupler 950 can act as an interface between optical fiber 954 and the silicon waveguide of silicon layer 930, whereas grating coupler 952 can act as an interface between the silicon waveguide and optical fiber 956. Both grating couplers can be configured to focus light 616 into a pre-determined direction, to reduce the energy loss of light 616 due to scattering and diffraction as the light enters or exits the silicon waveguide.

Figure 10B:
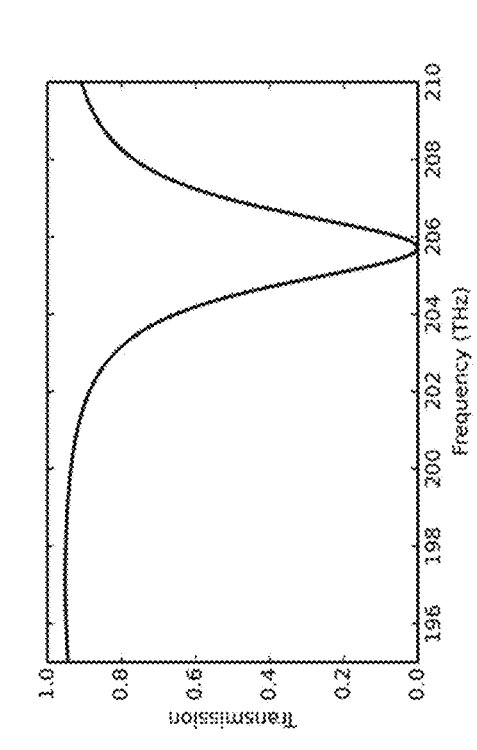
FIGS. 10A, 10B, 10C, and 10D are examples of operation of an optical modulator that can be used in the optical linked sensor network of FIG. 6.
Figure 10A:
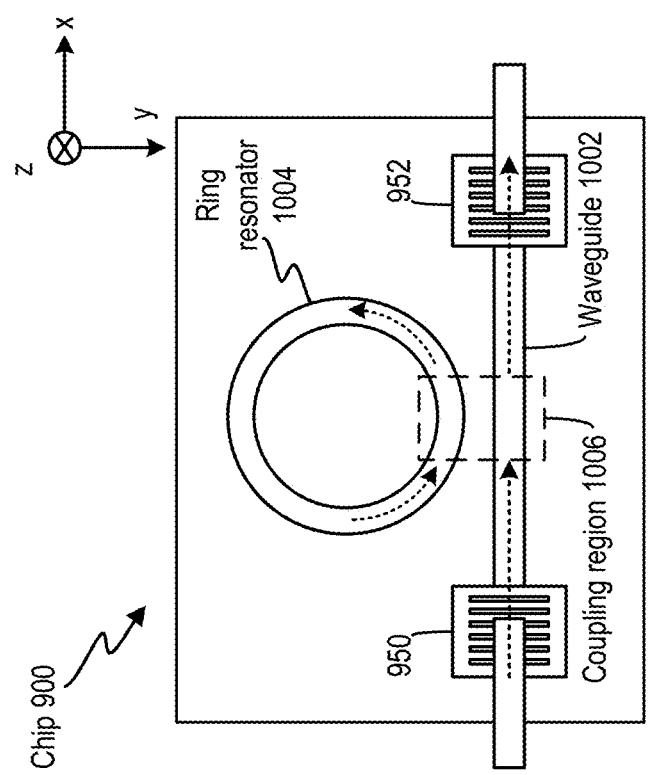

Reference is now made to FIG. 10A, which illustrates an overhead view of chip 900 of FIG. 9. As shown in FIG. 10A, chip 900 includes grating couplers 950 and 952, a silicon waveguide 1002 (formed in silicon layer 930), and a ring resonator 1004 which is configured as an optical modulator. Optical coupling can occur between silicon waveguide 1002 and ring resonator 1004 when light 616 propagates through a coupling region 1006 between silicon waveguide 1002 and ring resonator 1004. With optical coupling, light 616 entering coupling region 1006 will be transmitted into ring resonator 1004. Light 616 may propagate around ring resonator 1004, and some of it may re-enter waveguide 1002 and exit chip 900. In a case where light 616 accumulates a phase shift of $2\pi$ as light 616 re-enters coupling region 1006, critical coupling may occur, in which case light 616 will stay in ring resonator 1004 and will not re-enter silicon waveguide 1002. The phase shift experienced by light 116 as it propagates in ring resonator 1004 may be a function of, for example, the refractive index ($n_{eff}$) of ring resonator 1004, the frequency (or wavelength) of light 616, the circumference of ring resonator 1004, the temperature, etc. For example, as shown in FIG. 10B, for a given temperature, circumference, and refractive index of ring resonator 1004, the resonant frequency is 206 Terahertz (1 THz=$10^{12}$ Hz). For a component of light 616 associated with the resonant frequency, critical coupling may occur, and a transmission ratio (e.g., between the power of light 616 entering resonator 1004 and the power of light 616 re-entering silicon waveguide 1002) can become zero. In such as case, the component of light 616 stays in ring resonator 1004 and does not re-enter silicon waveguide 1002.

Figure 10C:
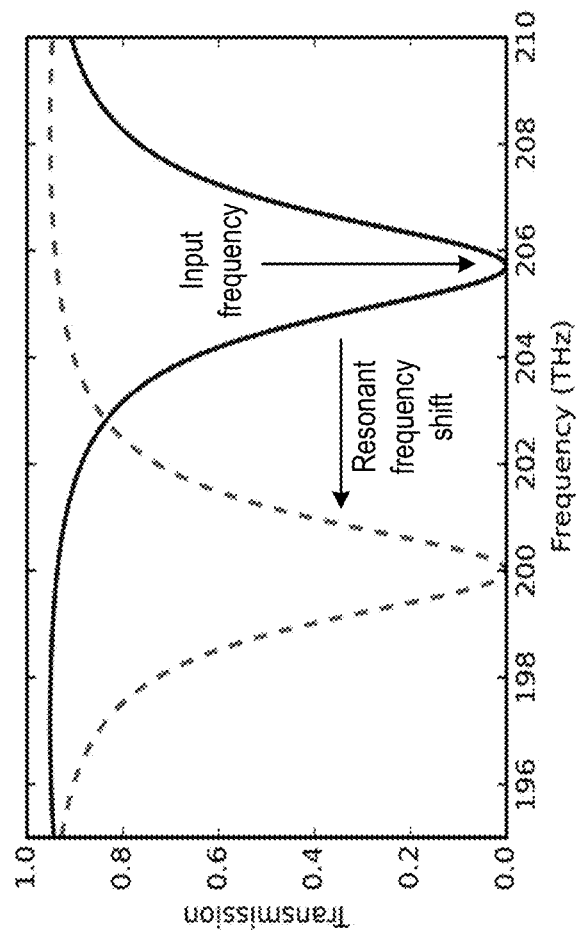

Ring resonator 1004 can be used to modulate the intensity of light 616 re-entering waveguide 1002 from ring resonator 1004. For example, referring to FIG. 10C, the resonant frequency may shift due to, for example, changes in the refractive index of ring resonator 1004. Because of the shift in resonant frequency, the transmission ratio for a component of light 616 with a 206 Terahertz can change from zero to close to unity. By modulating the resonant frequency of ring resonator 1004, the transmission ratio of light 616 may change accordingly, and an intensity of light 616 exiting waveguide 1002 can be modulated as a result. The refractive index of ring resonator 1004 can be modulated by modulating the free carrier density of the region of silicon layer 930 that forms ring resonator 1004.

Figure 10D:
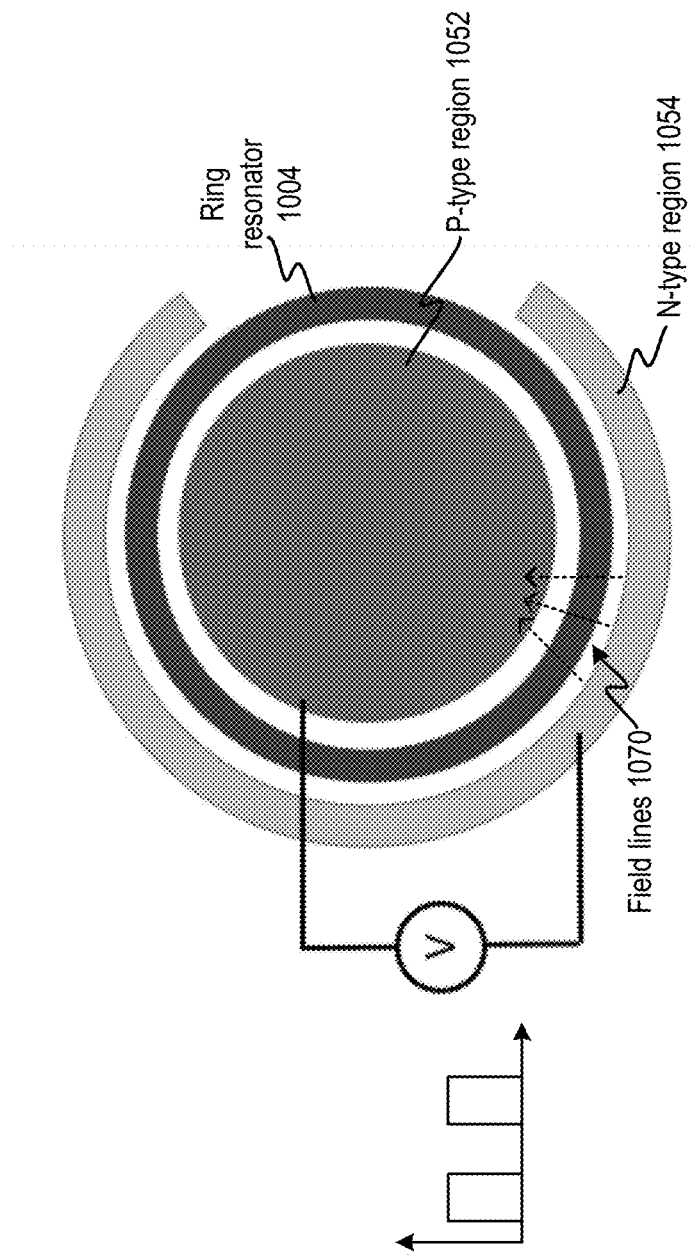

There are different ways of modulating the free carrier density of ring resonator 1004. One way is by employing a P-N diode. Reference is now made to FIG. 10D, which illustrates an example of ring resonator 1004 with a P-N diode. The P-N diode may include a region 1052 of silicon layer 930 with P-type carriers, and a region 1054 of silicon layer 930 with N-type carriers. Part of ring resonator 1004 can be sandwiched between regions 1052 and 1054. The P-N diode may receive a reverse bias voltage (e.g., with N-type region 1054 being biased at a higher voltage than N-type region 1052) from a voltage source 1060. The reverse bias voltage can create an electric field (e.g., indicated by field lines 1070) across ring resonator 1004. The electric field can create a depletion region within ring resonator 1004 by, for example, sweeping free P-type carriers within ring resonator 1004 towards N-type region 1054 and N-type carriers within ring resonator 1004 towards P-type region 1052. By modulating the free carrier density of ring resonator 1004, the refractive index as well as the resonant frequency of ring resonator 1004 can be modulated as well.

The ring resonator and P-N diode topology of FIG. 10D can be used for optical modulation as well as at receiver system 614. For example, the reverse bias voltage of the P-N diode can be configured to set the resonant frequency of ring resonator 1004 at the frequency of the component of light 616 to be modulated. On the receiver side, ring resonator 1004 with the P-N diode biased at the same reverse bias voltage as the optical modulator side can be used as part of a band-pass filter to band-pass only the modulated component of light 616. The modulated component can be provided to a photodetector to generate electrical signals representing the sensor data.

While FIG. 10A-FIG. 10D illustrate the use of a ring resonator as an optical modulator used in optically linked sensor network 600, it is understood other types of optical modulator can be used, such as Mach-Zehnder-Interferometers (MZI), vertical-cavity surface-emitting lasers (VCSEL), etc.

Figure 11:
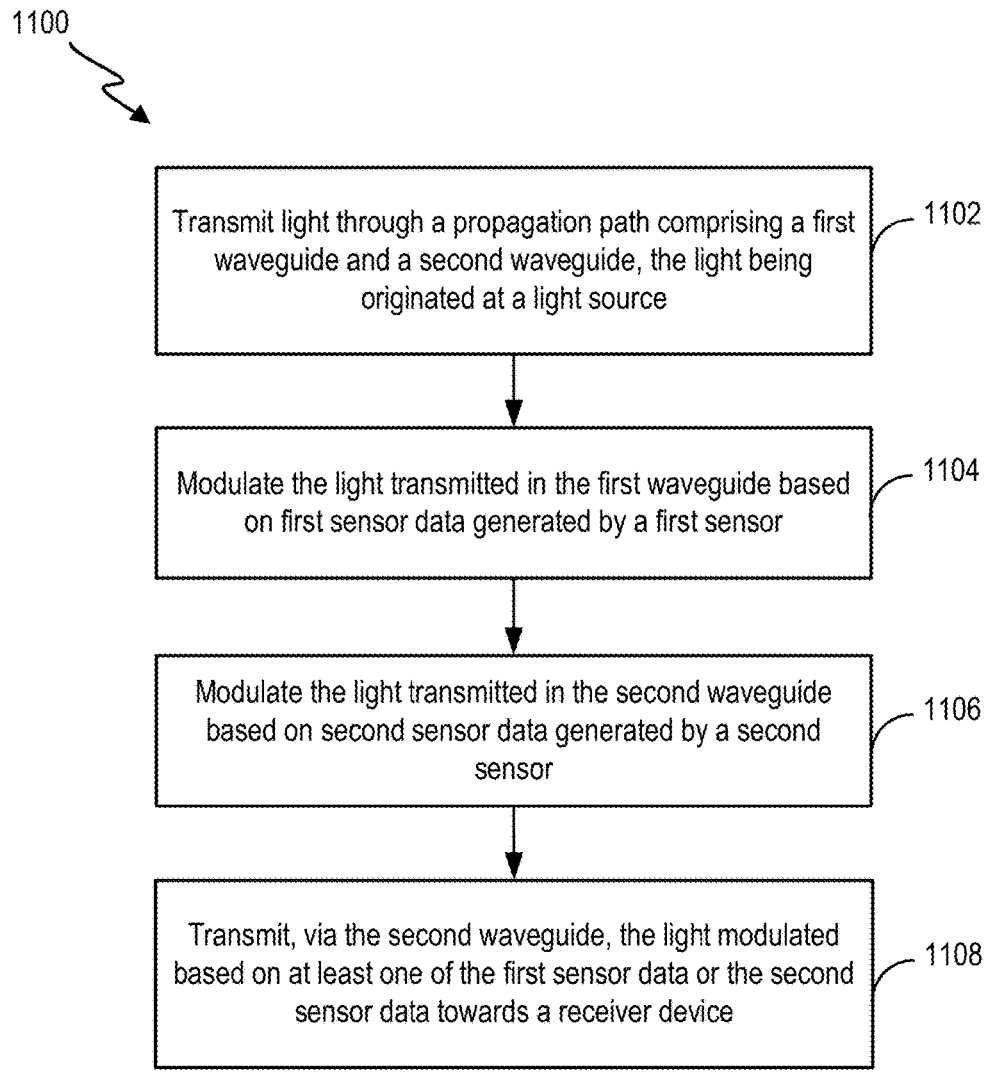
FIG. 11 is flowchart illustrating an example process of operating an optical linked sensor network.

FIG. 11 illustrates an embodiment of a flowchart of a process 1100 for operating an optical linked sensor network (e.g., optical linked sensor network 600 of FIG. 6). Process 1100 beings in step 1102, where light originated at a light source is transmitted through a propagation path comprising a first waveguide and a second waveguide. The first waveguide can include a silicon waveguide and can be coupled with a first sensor via a first optical modulator. The second waveguide can also include a silicon waveguide and can be coupled with a second sensor via a second optical modulator. The first and second sensor may include, for example, image sensors configured to capture images of a physical environment for location tracking, images of a user's eyeballs for gaze direction determination, etc.

At step 1104, the light transmitted in the first waveguide can be modulated by the first optical modulator based on first sensor data generated by the first sensor. At step 1106, the light transmitted in the second waveguide can be modulated by the second optical modulator based on second sensor data generated by the second sensor. The modulation of the light by the first optical modulator and by the second modulator can be based on a TDMA scheme, a WDMA scheme, or a combination of both. For example, with TDMA, the first optical modulator and the second optical modulator can be scheduled to modulate the light at different times. With WDMA, the first optical modulator and the second optical modulator can be configured to modulate different frequency components of the light at substantially the same time. The modulation can be in the form of amplitude modulation, phase modulation, or a combination of both.

At step 1108, the light modulated based on at least one of the first sensor data or the second sensor data can be transmitted towards a receiver device via the second waveguide. The modulated light can be converted to electrical signals by a photodetector at the receiver device. The electrical signals can be provided to a controller to extract the at least one of the first sensor data or the second sensor data, and to perform additional processing of the extracted data (e.g., for location tracking, gaze direction determination, etc.).

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, and/or hardware.

Steps, operations, or processes described may be performed or implemented with one or more hardware or software modules, alone or in combination with other devices. In some embodiments, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations described. The apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

The invention claimed is:

1. An apparatus being part of a wearable device, the apparatus comprising:
a first waveguide configured to propagate light originated from a light source;
a first modulator coupled with the first waveguide;
an image sensor coupled with the first modulator;
a second waveguide coupled with the first waveguide to form a propagation path for the light between the light source and a receiver device;
a second modulator coupled with the second waveguide; and
a motion sensor coupled with the second modulator,
wherein the image sensor is configured to generate image data of an environment in which the apparatus is located;
wherein the first modulator is configured to modulate the light propagating in the first waveguide based on the image data;
wherein the motion sensor is configured to generate motion data of the wearable device;
wherein the second modulator is configured to modulate the light propagating in the second waveguide based on the motion data; and
wherein the second waveguide is configured to propagate the light modulated by at least one of the first modulator or the second modulator towards the receiver device, to enable the receiver device to obtain at least one of the image data or the motion data and to enable the wearable device to determine output content based on the at least one of the image data or the motion data.

2. The apparatus of claim 1, wherein the apparatus is a first apparatus of the wearable device; and
wherein the light source and the receiver device are in a second apparatus that is also part of the wearable device.

3. The apparatus of claim 1, wherein:
the first modulator and the second modulator are scheduled to modulate the light transmitted in the first waveguide at different times based on a time-division multiple access (TDMA) scheme.

4. The apparatus of claim 3, wherein the light is associated with a single wavelength.

5. The apparatus of claim 4, further comprising:
a first buffer coupled with the image sensor; and
a second buffer coupled with the motion sensor;
wherein the first buffer is configured to store the image data generated by the image sensor during a time when the first modulator is not scheduled to modulate the light propagating in the first waveguide; and
wherein the second buffer is configured to store the motion data generated by the motion sensor during a time when the second modulator is not scheduled to modulate the light propagating in the second waveguide.

6. The apparatus of claim 1, wherein:
the light includes a first component associated with a first wavelength and a second component associated with a second wavelength; and
the first modulator and the second modulator are configured to modulate, respectively, the first component based on the image data and the second component based on the motion data according to a wavelength division multiple access (WDMA) scheme.

7. The apparatus of claim 6, wherein the first modulator and the second modulator are configured to modulate, respectively, the first component and the second component at substantially identical time.

8. The apparatus of claim 1, wherein the first modulator is configured to modulate an intensity of the light propagating in the first waveguide; and
wherein the second modulator is configured to modulate an intensity of light propagating in the second waveguide.

9. The apparatus of claim 8, wherein the first modulator comprises a first ring resonator, the first ring resonator being associated with a configurable first resonant frequency, the first ring resonator being capable of changing the intensity of the light propagating in the first waveguide based on a relationship between the first resonant frequency and a frequency of a component of the light propagating in the first waveguide;

wherein the second modulator comprises a second ring resonator, the second ring resonator being associated with a configurable second resonant frequency, the second ring resonator being capable of changing the intensity of the light propagating in the second waveguide based on a relationship between the second resonant frequency and a frequency of a component of the light propagating in the second waveguide;

wherein the first modulator is configured to modulate the first resonant frequency of the first ring resonator to modulate the intensity of the light propagating in the first waveguide; and wherein the second modulator is configured to modulate the second resonant frequency of the second ring resonator to modulate the intensity of the light propagating in the second waveguide.

10. The apparatus of claim 9, wherein the first modulator includes a first diode controllable to change the first resonant frequency of the first ring resonator by at least changing a free carrier concentration within the first ring resonator; and wherein the second modulator includes a second diode controllable to change the second resonant frequency of the second ring resonator by at least changing a free carrier concentration within the second ring resonator.

11. The apparatus of claim 1, wherein:
the first waveguide comprises a first silicon waveguide; and
the second waveguide comprises a second silicon waveguide.

12. The apparatus of claim 11, wherein:
the first silicon waveguide is part of a first chip;
the second silicon waveguide is part of a second chip; and
the first silicon waveguide of the first chip is coupled with the second silicon waveguide of the second chip via an optical fiber.

13. The apparatus of claim 12, further comprising:
a first grating coupler; and
a second grating coupler,
wherein the first grating coupler is coupled with the first silicon waveguide and with a first end of the optical fiber to direct the light from the first silicon waveguide into the optical fiber; and
wherein the second grating coupler is coupled with a second end of the optical fiber and with the second silicon waveguide to direct the light from the optical fiber into the second silicon waveguide.

14. The apparatus of claim 12, wherein:
the first silicon waveguide and the first modulator forms a first silicon photonic die;
the image sensor is part of a first sensor die;
the first chip comprises the first sensor die and the first silicon photonic die forming a first vertical stack structure;
the second silicon waveguide and the second modulator forms a second silicon photonic die;
the motion sensor is part of a second sensor die; and
the second chip comprises the second sensor die and the second silicon photonic die forming a second vertical stack structure.

15. The apparatus of claim 1, wherein at least one of the image data or the motion data are defined according to an application layer protocol specification of Mobile Industry Processor Interface (MIPI).

16. The apparatus of claim 1, further comprising a set of electrical signal paths coupled with each of the image sensor and the motion sensor;

wherein the set of electrical signal paths are configured to transmit control signals and clock signals from a controller to each of the image sensor and to the motion sensor.

17. The apparatus of claim 1, wherein the first waveguide and the second waveguide forms a shared physical medium over which one or more communication channels are formed, the physical medium being shared between the image sensor and the motion sensor for transmission to the receiver device using the one or more communication channels.

18. The apparatus of claim 1, wherein the motion data comprise data for tracking a location of the wearable device.

19. The apparatus of claim 1, wherein the first modulator and the second modulator are configured to switch between a TDMA scheme and a WDMA scheme to modulate the light based on a mode of operation of apparatus.

20. The apparatus of claim 19, wherein the first modulator and the second modulator are configured to modulate the light based on the TDMA scheme when the apparatus is in a low power mode and to modulate the light based on the WDMA scheme when the apparatus is in a high power mode.

21. The apparatus of claim 19, wherein the first modulator and the second modulator are configured to modulate the light based on the TDMA scheme when the apparatus in a static mode and to modulate the light based on the WDMA scheme when the apparatus is in a non-static mode.

22. The apparatus of claim 1, wherein the image sensor is a first image sensor;
wherein the apparatus further comprises:
a third waveguide with the first waveguide and a fourth waveguide coupled with the second waveguide to form the propagation path;
a third modulator coupled with the third waveguide;
a fourth modulator coupled with the fourth waveguide;
a second image sensor coupled with the third modulator; and
a locations sensor coupled with the fourth modulator;
wherein the first modulator and the third modulator are configured to modulate the light based on a WDMA scheme;
and wherein the second modulator and the fourth modulator are configured to modulate the light based on a TDMA scheme.

23. A method, comprising:
transmitting light through a propagation path comprising a first waveguide of a wearable device and a second waveguide of the wearable device, the light being originated at a light source of the wearable device;
modulating the light transmitted in the first waveguide based on image data of an environment in which the wearable device is located, the image data being generated by an image sensor of the wearable device;
modulating the light transmitted in the second waveguide based on motion data of the wearable device generated by a motion sensor of the wearable device; and
transmitting, via the second waveguide, the light modulated based on at least one of the image data or the image data towards a receiver device of the wearable device to enable the wearable device to determine output content based on the at least one of the image data or the motion data.

24. The method of claim 23, wherein modulating the light transmitted in the first waveguide comprises modulating a first frequency component of the light transmitted in the first waveguide; and wherein modulating the light transmitted in the second waveguide comprises modulating the first frequency component of the light transmitted in the second waveguide.

25. The method of claim 23, wherein modulating the light in the first waveguide comprises modulating a first frequency component of the light transmitted in the first waveguide; and wherein modulating the light transmitted in the second waveguide comprises modulating a second frequency component of the light transmitted in the second waveguide.

* * * * *